(12) United States Patent
Nittou

(10) Patent No.: US 8,355,094 B2
(45) Date of Patent: Jan. 15, 2013

(54) LIQUID CRYSTAL DISPLAY UNIT AND GAMING DEVICE

(75) Inventor: Eiji Nittou, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 311 days.

(21) Appl. No.: 12/863,237

(22) PCT Filed: Jan. 30, 2009

(86) PCT No.: PCT/JP2009/051638
§ 371 (c)(1),
(2), (4) Date: Jul. 16, 2010

(87) PCT Pub. No.: WO2009/125619
PCT Pub. Date: Oct. 15, 2009

(65) Prior Publication Data
US 2011/0051038 A1    Mar. 3, 2011

(30) Foreign Application Priority Data
Apr. 11, 2008   (JP) .................................. 2008-104020

(51) Int. Cl.
G02F 1/1335    (2006.01)
(52) U.S. Cl. ......................................................... 349/62
(58) Field of Classification Search ...................... 349/62
See application file for complete search history.

(56) References Cited

U.S. PATENT DOCUMENTS

| | | | |
|---|---|---|---|
| 5,371,510 A * | 12/1994 | Miyauchi et al. | 345/7 |
| 6,906,762 B1 | 6/2005 | Witehira et al. | |
| 2004/0125592 A1 | 7/2004 | Nagakubo et al. | |
| 2004/0219965 A1 | 11/2004 | Okada | |
| 2009/0117977 A1 * | 5/2009 | Gelber et al. | 463/20 |
| 2009/0181758 A1 * | 7/2009 | Loose et al. | 463/20 |
| 2011/0134363 A1 * | 6/2011 | Ikeda | 349/62 |

FOREIGN PATENT DOCUMENTS

| | | |
|---|---|---|
| CN | 1506733 A | 6/2004 |
| JP | 62-122494 | 6/1987 |
| JP | 2002-504764 | 2/2002 |
| JP | 2004-073654 | 3/2004 |
| JP | 2005-185624 | 7/2005 |
| JP | 2005-312686 | 11/2005 |
| JP | 2006-239292 | 9/2006 |

OTHER PUBLICATIONS

International Search Report for PCT/JP2009/051638, mailed Mar. 24, 2009.

* cited by examiner

*Primary Examiner* — Timothy L Rude
(74) *Attorney, Agent, or Firm* — Nixon & Vanderhye, P.C.

(57) ABSTRACT

The present invention includes a primary display region (15a) capable of being directly viewed by a primary viewer of a first liquid crystal display element (2); and a secondary display region (15b) incapable of being directly viewed by the viewer; a backlight device (3) provided so as to face only a portion of a back surface (2b) of the first liquid crystal display element (2) which portion corresponds to the secondary display region (15b); and a reflecting section (4, 5, 6, 7) configured to cause light emitted from the secondary display region (15b) in a forward direction to be emitted from the back surface (2b) of the primary display region (15a) in the forward direction again. This arrangement enables production of a liquid crystal display unit (1) which can carry out, with a simple arrangement, a display that provides viewers with perception of depth.

18 Claims, 19 Drawing Sheets

US 8,355,094 B2

LIQUID CRYSTAL DISPLAY UNIT AND GAMING DEVICE

This application is the U.S. national phase of International Application No. PCT/JP2009/051638 filed 30 Jan. 2009, which designated the U.S. and claims priority to JP Application No. 2008-104020 filed 11 Apr. 2008, the entire contents of each of which are hereby incorporated by reference.

TECHNICAL FIELD

The present invention relates to a liquid crystal display unit and a gaming device. In particular, the present invention relates to a liquid crystal display unit and a gaming device each of which (i) includes: a single liquid crystal display element; and a reflecting section, provided with respect to a portion of the liquid crystal display element, so that an image displayed in the portion is projected onto a back surface of the liquid crystal display element, and (ii) can thus carry out, with use of the single liquid crystal display element, a liquid crystal display which allows viewers to have perception of depth.

BACKGROUND ART

A liquid crystal display element has been widely used as a component of an information display section of a gaming device such as a pachinko device.

In recent years, there has been a demand for a gaming device which can display in the information display section not only information to be displayed by the liquid crystal display element but also, for example, an accessory provided behind the liquid crystal display element. The following description refers to FIG. 16, which is a view schematically illustrating an arrangement of a gaming device, and to (a) through (c) of FIG. 17, each of which is a view illustrating a display in an information display section of the gaming device.

As illustrated in FIG. 16, the gaming device 90 includes on a front surface a circular game board 92 which shows a stage of a game. The gaming device 90 further includes at a substantially central portion of the game board 92 an information display section 94 which includes a liquid crystal display element as a primary component.

The information display section 94 displays various types of information in accordance with a stage of the game. In a case where, for example, the gaming device 90 is a device, such as a slot machine, which shows a three-digit number that changes in accordance with the stage of the game, the liquid crystal display element displays a number such as "567" in the information display section 94 as illustrated in (a) of FIG. 17.

In a case where, for example, the three-digit number has become equal to a three-digit number, such as "777", in which respective digits are identical to a predetermined single number (see (b) of FIG. 17), a region displaying the number "7" located in the middle of the three-digit number becomes transparent. As illustrated in (c) of FIG. 17, this results in the information display section 94 displaying (i) the numbers "7" and "7" displayed by the liquid crystal display element and (ii) an accessory 52 (doll) provided behind the liquid crystal display element.

Various techniques for carrying out such a display have been proposed. Patent Literature 1, for example, discloses a technique in which polymer-dispersed liquid crystal is used as an LCD shutter. This technique is described below with reference to FIGS. 18 through 21. FIG. 18 is an elevational view illustrating an arrangement of a game machine of Patent Literature 1 in its entirety. As illustrated in FIG. 18, the game machine 101 of Patent Literature 1 includes at a central portion of its game board 106 a center case 111, in which an image display device 108 for displaying an image is provided.

Specifically, as illustrated in FIG. 19, which is an exploded perspective view illustrating an arrangement of the center case 111, the center case 111 mainly includes: an armor section 409; the above image display device 108; and an accessory 506 provided behind the image display device 108.

As illustrated in FIG. 20, which is a view illustrating an arrangement of the image display device 108, the image display device 108 includes, for example, the following members arranged in an order presented below: a liquid crystal panel 501; diffusing plates 502; a light guide plate 503; a reflecting plate 504; and an LCD shutter 505. The image display device 108 further includes: an LCD light source 513, which is used for an image display and which is provided in a vicinity of an end of the light guide plate 503; and a light source 514, which is used for an accessory and which is provided in a vicinity of an end of the LCD shutter 505.

According to the game machine 101 of Patent Literature 1, the LCD shutter 505 included in the image display device 108 is made of polymer-dispersed liquid crystal. The polymer-dispersed liquid crystal enables a switch between (i) a state in which the accessory 506 is visible and (ii) a state in which the accessory 506 is invisible. The following description refers to (a) and (b) of FIG. 21, each of which is an explanatory view illustrating an operating principle of the polymer-dispersed liquid crystal included in the LCD shutter 505. (a) of FIG. 21 shows how liquid crystal molecules are oriented when a voltage is applied, and (b) of FIG. 21 shows how the liquid crystal molecules are aligned when no voltage is applied.

As illustrated in (a) and (b) of FIG. 21, light is transmitted through a layer of the polymer-dispersed liquid crystal differently depending on whether a voltage is applied to the liquid crystal layer. Specifically, as illustrated in (a) of FIG. 21, when a voltage is applied to the liquid crystal layer, light is transmitted through the polymer-dispersed liquid crystal (LCD shutter 505: ON). Thus, a game player can see the accessory 506 provided behind the image display device 108.

In contrast, as illustrated in (b) of FIG. 21, when no voltage is applied to the liquid crystal layer, light is scattered by the polymer-dispersed liquid crystal, so that the liquid crystal layer becomes whitish (LCD shutter 505: OFF). Consequently, the game player cannot see the accessory 506 provided behind the image display device 108.

As described above, according to the game machine 101 of Patent Literature 1, the use of the polymer-dispersed liquid crystal enables control over whether the accessory 506 provided behind the image display device 108 is visible or invisible (unshielded or shielded).

In addition, Patent Literature 2 discloses an arrangement including a reel 604 on which designs are formed (see FIG. 22). The arrangement includes a panel display section 606 constituted by a transparent acrylic plate. The arrangement further includes the following components which are stacked on top of one another and which face an inner surface of the panel display section 606: picture sheets 600, each of which is a transparent film material on which various pictures are printed; a performance display section 601 constituted by a liquid crystal display device including a transparent electrode made of, e.g., ITO; and an electronic shutter section 602 also including, e.g., a liquid crystal film. The arrangement also includes cold cathode fluorescent lamps (CCFL) 603 which are provided at respective upper and lower display regions on an inner surface side of the panel display section and which carry out respective functions as a backlight device for a liquid crystal display and as an illumination device for illuminating the designs on the reel 604.

The panel display section 606, the picture sheets 600, the performance display section 601, and the electronic shutter section 602 constitute a region for displaying a performance.

The following description deals with respective operations of the individual constituents. The pictures on the picture sheets 600 are constantly visible to a game player, irrespective of how a performance of a pachinko-slot machine is controlled.

The region for displaying a performance is a region for displaying an image performance such as a jackpot performance and various announcement performances.

The electronic shutter section 602 switches a state of a predetermined region between a light-transmitting state and a light-blocking state in response to an applied voltage. In other words, the electronic shutter section 602 switches the state of the predetermined region between (i) a state in which the designs on the reel 604 are visible through the panel display section 606 and (ii) a state in which the designs on the reel 604 are invisible through the panel display section 606. The performance displayed in the region for displaying a performance can thus be switched between (i) a normal display performance (i.e., a state in which only a performance display is visible because the reel 604 is shielded by the electronic shutter section) and (ii) a semitransparent display performance (i.e., a state in which the designs on the reel located behind the electronic shutter section 602 are visible through a performance display).

CITATION LIST

Patent Literature 1
Japanese Patent Application Publication, Tokukai, No. 2005-185624 A (Publication Date: Jul. 14, 2005)
Patent Literature 2
Japanese Patent Application Publication, Tokukai, No. 2004-073654 A (Publication Date: Mar. 11, 2004)

SUMMARY OF INVENTION

The conventional game machine 101 disclosed in Patent Literature 1, which includes an accessory and polymer-dispersed liquid crystal having a shutter function, unfortunately has the following problems.

First, to allow viewers to have perception of depth to an image displayed in the information display section 94, it has been necessary to use an actuality of, e.g., an accessory 506. Thus, in a case where a large accessory 506 is provided, it has been necessary to secure a space for the accessory. This has consequently impeded production of a compact game machine. In addition, it takes time and trouble to replace such an accessory 506 after installation.

Another problem is that in a case where a movable accessory is used, it is even more difficult to install such an accessory.

Further, the arrangement of Patent Literature 1 includes two light sources, namely the LCD light source 513 for image display and the light source 514 for an accessory. The arrangement thus uses a plurality of light sources. This also poses a problem concerning efficiency in light source use.

In addition, shielding the accessory 506 provided behind the liquid crystal panel 501 requires polymer-dispersed liquid crystal 505 having a shutter function. This tends to increase a production cost.

According to the shielding method using polymer-dispersed liquid crystal, the scattering of light causes the entire liquid crystal layer to become whitish. This blurs an outline of the accessory and causes the accessory to have unclear color. However, the game player can still recognize, although vaguely, existence of the accessory.

Since the game player is already aware of the existence of the accessory when the polymer-dispersed liquid crystal is in the light-scattering state, the game player is not very impressed when the light-scattering state of the polymer-dispersed liquid crystal is switched to the light-transmitting state so that the accessory is clearly visible.

According to the arrangement of Patent Literature 1, the polymer-dispersed liquid crystal 505 having a shutter function is not provided with a member for uniforming luminance (e.g., a light guide, a reflecting sheet, a diffusing plate for diffusing light, and an optical sheet such as a diffusing sheet for simultaneously converging and scattering light). Thus, when the polymer-dispersed liquid crystal 505 having a shutter function is in the OFF state (i.e., when the polymer-dispersed liquid crystal is in the light-scattering state), the image display device 108 displays an image whose quality is problematically impaired due to, e.g., luminance unevenness.

According to Patent Literature 2, the reel 604 provided with designs is used as an accessory. This arrangement does not solve the above problems arising from the arrangement of Patent Literature 1.

The present invention has been accomplished in view of the above problems. It is an object of the present invention to provide a liquid crystal display unit and a gaming device each of which (i) has a simple arrangement and (ii) is capable of performing a display which allows viewers to have perception of depth.

It is another object of the present invention to provide a liquid crystal display unit and a gaming device each of which (i) has a high efficiency in light source use and (ii) readily allows an image to be replaced and a moving image to be displayed.

In order to solve the above problems, a liquid crystal display unit of the present invention includes: a first liquid crystal display element on which front surface an image is displayed; a backlight device provided behind the first liquid crystal display element; and a reflecting section from which light emitted from the first liquid crystal display element is reflected, a display region on the front surface of the first liquid crystal display element, including (i) a primary display region which can be directly viewed by a primary viewer of the first liquid crystal display element and (ii) a secondary display region which cannot be directly viewed by the primary viewer, the backlight device being provided only in a region behind the first liquid crystal display element and the region corresponding to the secondary display region, and the reflecting section being provided so that light emitted from the secondary display region toward the primary viewer is reflected from the reflecting section and is then emitted again from behind the primary display region toward the primary viewer.

The liquid crystal display unit of the present invention may be arranged such that an image displayed in the secondary display region is reflected from the reflecting section so as to be displayed in the primary display region.

The above arrangement, unlike conventional arrangements, does not include an accessory or polymer-dispersed liquid crystal having a shutter function. Instead, the above arrangement includes a reflecting section with respect to a portion of the first liquid crystal display element so that an image displayed in the secondary display region is projected for a display from behind the first liquid crystal display element onto the primary display region. This arrangement enables production of a liquid crystal display unit which can carry out, with use of only a single liquid crystal display element, a display that allows viewers to have perception of depth.

Further, the above arrangement, in which an image in the secondary display region of the liquid crystal display element is displayed in the primary display region, does not require a plurality of light sources to carry out a display which allows viewers to have perception of depth. Thus, the above arrangement enables production of a liquid crystal display unit which has a high efficiency in light use and which readily allows an image to be replaced and a moving image to be displayed.

The above arrangement enables the liquid crystal display unit to display a plurality of images with use of an image displayed by the first liquid crystal display element. This makes it possible to, e.g., replace a display image and readily switch a state of the plurality of images between (i) a state in which the images are displayed and (ii) a state in which no images are displayed.

The liquid crystal display unit of the present invention may preferably be arranged such that the reflecting section includes: a first mirror provided in front of the first liquid crystal display element; and a second mirror provided behind the first liquid crystal display element.

The liquid crystal display unit of the present invention may preferably be arranged such that the first and second mirrors each include at least one of a plate-shaped mirror, a curved mirror, and a spherical mirror.

The liquid crystal display unit of the present invention may preferably be arranged such that the first and second mirrors each include two plate-shaped mirrors, and the two mirrors provided in each of the first and second mirrors are at an angle of 90 degrees with each other.

The liquid crystal display unit of the present invention may preferably be arranged such that the two mirrors provided in each of the first and second mirrors are at an angle of 45 degrees with the first liquid crystal display element.

The liquid crystal display unit of the present invention may preferably be arranged such that the first and second mirrors are first and second hemispherical mirrors, respectively, and the first and second hemispherical mirrors are provided so that their inner surfaces face each other.

The above arrangements each include a mirror(s) both in front of and behind the first liquid crystal display element. This allows light emitted from the secondary display region to be readily emitted from behind the primary display region in a forward direction.

In the case where the mirrors are plate-shaped and, in particular, form an angle of 90 degrees, the reflecting section can be optically designed easily.

Further, in a case where the mirrors are plate-shaped and, in particular, the two mirrors provided in front of the first liquid crystal display element form an angle of 90 degrees; the two mirrors provided behind the first liquid crystal display element form an angle of 90 degrees; and each of the four mirrors is at an angle of 45 degrees with the first liquid crystal display element, the reflecting section can be optically designed easily. For example, in a case where the first liquid crystal display element is provided with, e.g., polarizing plates, adjustments of their respective polarization axes can be made easily, for example.

In a case where the mirrors are curved or spherical, it is easy to, e.g., deform a display image and change a focus location of a display image. Specifically, this arrangement readily provides a display image with peculiar perception of depth in which, for example, an image is viewed as protruding from a plane.

The liquid crystal display unit of the present invention may be arranged such that the reflecting section is provided so as to be able to change a length of an optical path of the light emitted from the secondary display region, which optical path extends from a front surface of the secondary display region to a back surface of the primary display region.

The liquid crystal display unit of the present invention may preferably be arranged such that the reflecting section includes mirrors at least part of which is movably provided; and the length of the optical path is variable by moving the at least part of the mirrors.

The above arrangements allow a change in length of the optical path from the secondary display region to the back surface of the primary display region. This makes it possible to variously change the perception of depth for a display image.

Further, changing the length of the optical path easily changes a rate of compression of a display image.

In addition, in a case where the reflecting section includes movable mirrors, controlling location of such mirrors easily changes the length of the optical path and the perception of depth for an image as a result.

The liquid crystal display unit of the present invention may preferably further include: a second liquid crystal display element which has a scattering function and which is provided in a region behind the first liquid crystal display element, which region corresponds to the primary display region.

The liquid crystal display unit of the present invention may preferably be arranged such that the second liquid crystal display element is a polymer-dispersed liquid crystal element.

The above arrangements enable an image in the primary display region to be displayed with a higher luminance uniformity.

The above arrangement includes a polymer-dispersed liquid crystal display element not as so-called shielding means as in the above-described conventional arrangement, but as means for enhancing the luminance uniformity of a backlight reflected from the reflecting section.

As a result, it is possible to display a higher quality image in the primary display region With the use of the polymer-dispersed liquid crystal display element, the second liquid crystal display element having a scattering function can be easily formed.

The liquid crystal display unit of the present invention may be arranged such that the first liquid crystal display element is capable of displaying different images in respective different directions.

The liquid crystal display unit of the present invention may preferably be arranged such that the first liquid crystal display element is a dual view liquid crystal display element.

The liquid crystal display unit of the present invention may preferably further include: a mirror, provided in front of the first liquid crystal display element, which causes the images displayed in the respective different directions to be displayed in an identical direction.

The above arrangements each allow the first liquid crystal display element to display different images.

The liquid crystal display unit of the present invention may be arranged such that the first liquid crystal display element is inclined with respect to the primary viewer of the first liquid crystal display element.

The above arrangements each allow the first liquid crystal display element to display different images in different directions, respectively.

Thus, it is possible to carry out a wider variety of displays. In particular, in a case where the liquid crystal display unit includes a mirror, such as a double-sided mirror, for causing the images displayed in the different directions to be displayed in a single direction, such different images can be easily displayed to the primary viewer so that the images do not overlap each other. In other words, it is possible to expand the display region directly viewed by the primary viewer.

The use of a so-called dual view liquid crystal display element as the first liquid crystal display element facilitates displaying of the different images.

Further, in a case where the first liquid crystal display element is inclined toward the primary viewer, the optical design including, e.g., the mirrors can be realized easily.

The liquid crystal display unit of the present invention may be arranged such that the display region of the first liquid crystal display element is provided so that the primary display region and the secondary display region are adjacent to each other in an up-and-down direction when viewed by the primary viewer of the first liquid crystal display element.

The above arrangement enables production of a liquid crystal display unit in which an image displayed in a lower display region can be projected onto an upper display region for a display, and in which an image displayed in the upper display region can be projected onto the lower display region for a display.

The liquid crystal display unit having the above arrangement can display respective images in the upper display region and the lower display region so that the images overlap each other, and can thus provide viewers with perception of depth.

The liquid crystal display unit of the present invention may be arranged such that the display region of the first liquid crystal display element is provided so that the primary display region and the secondary display are adjacent to each other in a right-and-left direction when viewed by the primary viewer of the first liquid crystal display element.

The above arrangement enables production of a liquid crystal display unit in which an image displayed in a right display region can be projected onto a left display region for a display, and in which an image displayed in the left display region can be projected onto the right display region for a display.

The liquid crystal display unit having the above arrangement can display respective images in the right display region and in the left display region so that the images overlap each other, and can thus provide viewers with perception of depth of depth.

A gaming device of the present invention preferably includes any one of the above liquid crystal display units.

The above arrangement, unlike conventional arrangements, does not use an accessory to provide viewers with perception of depth. The above arrangement enables production of a gaming device which can provide the primary viewer of the first liquid crystal display element with perception of depth with use of location difference between the following two images: (i) an image directly displayed by the first liquid crystal display element; and (ii) an image displayed by projecting an image onto the back surface of the first liquid crystal display element with use of the reflecting sections.

In the above arrangement, the image projected onto the back surface of the first liquid crystal display element serves a function of the conventional accessory.

As described above, the present invention does not require a conventional accessory. This eliminates the need to secure a space especially for an accessory, and thus enables production of a compact gaming device.

Additional objects, features, and strengths of the present invention will be made clear by the description below. Further, the advantages of the present invention will be evident from the following explanation in reference to the drawings.

Figure 1:
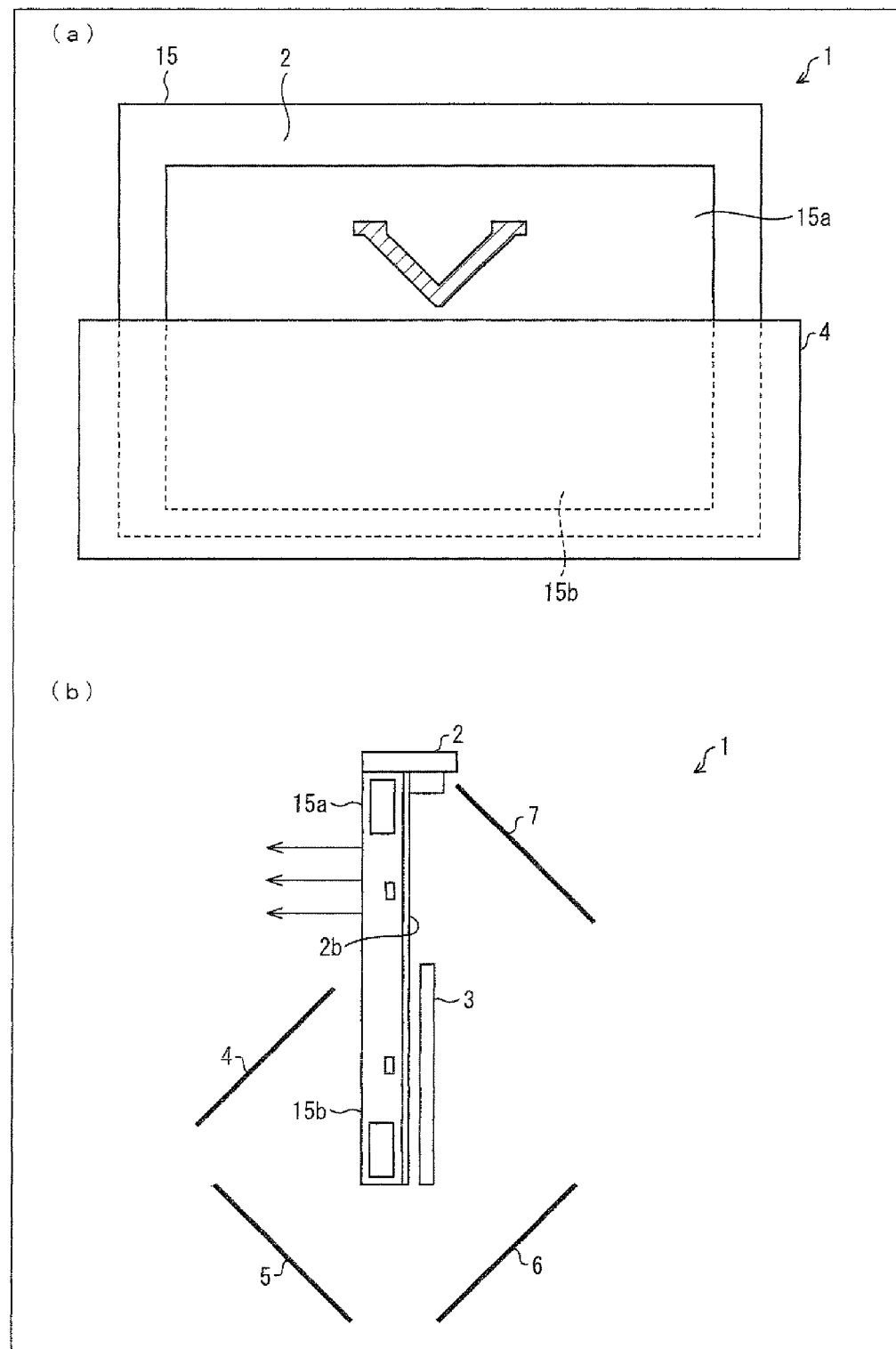
FIG. 1 is a view illustrating a liquid crystal display unit in accordance with an embodiment of the present invention which liquid crystal display unit is being observed in a state where with respect to a primary viewer of a first liquid crystal display element, (i) an image is displayed in a primary display region and (ii) total transmission (white display) is carried out in a secondary display region of the first liquid crystal display element, wherein (a) illustrates a display region of the liquid crystal display unit and (b) schematically illustrates an arrangement of the liquid crystal display unit.

REFERENCE SIGNS LIST 1 liquid crystal display unit
2 first liquid crystal display element
2a dual view liquid crystal display element
2b back surface of the first liquid crystal display element
3 backlight device
4 first mirror (reflecting section)
5 second mirror (reflecting section)
6 third mirror (reflecting section)

7 fourth mirror (reflecting section)
9 polymer-dispersed liquid crystal display element (second liquid crystal display element)
15 display region
15a directly viewed display region (primary display region)
15b image projecting display region (secondary display region)
20, 20a gaming device

DESCRIPTION OF EMBODIMENTS

Embodiment 1

Figure 2:
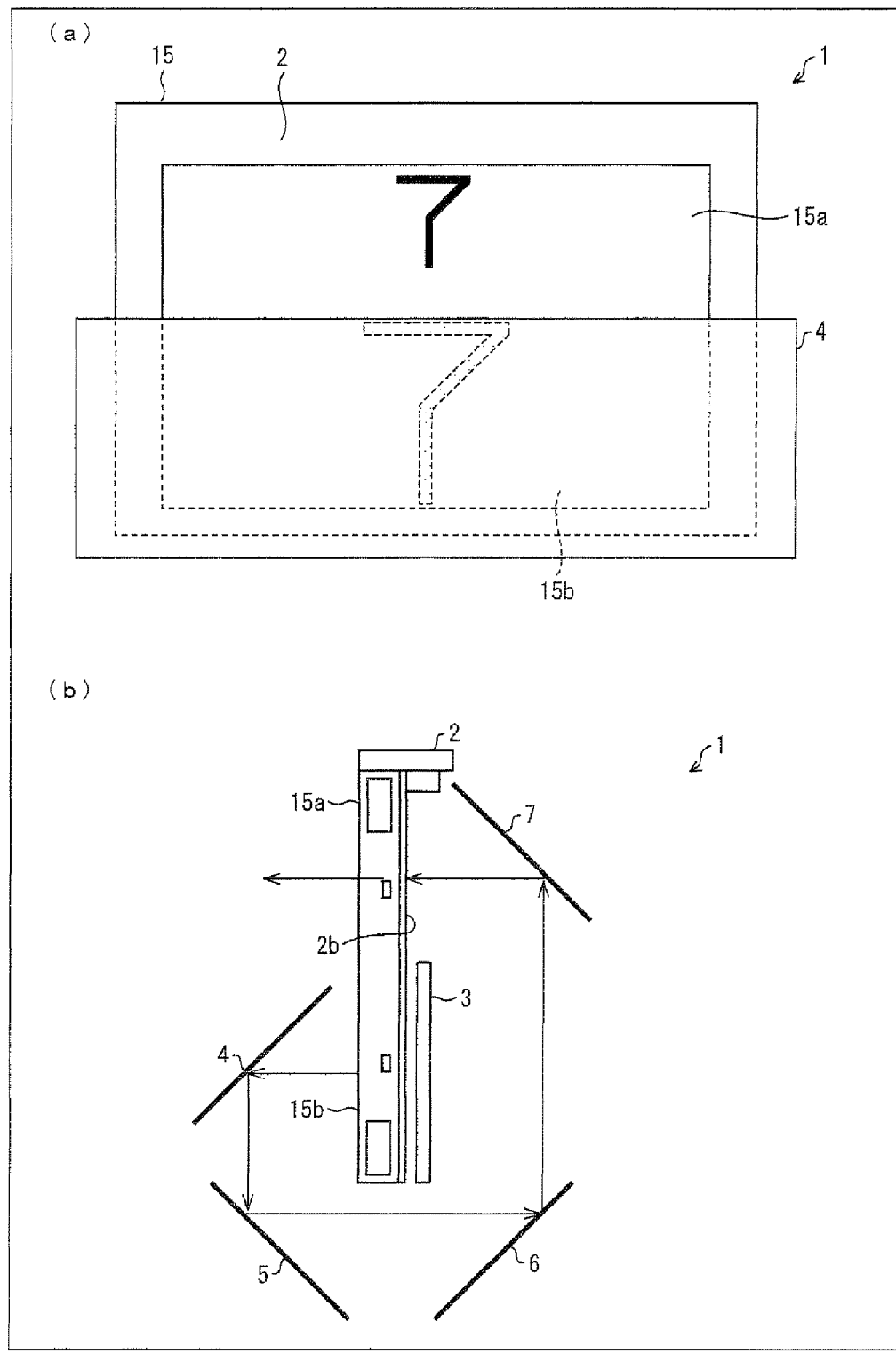
FIG. 2 is a view illustrating the liquid crystal display unit in accordance with the embodiment of the present invention which liquid crystal display unit is being observed in a state where with respect to the primary viewer of the first liquid crystal display element, (i) total transmission (white display) is carried out in the primary display region and (ii) an image is displayed in the secondary display region of the first liquid crystal display element, wherein (a) illustrates the display region of the liquid crystal display unit and (b) schematically illustrates the arrangement of the liquid crystal display unit.
Figure 3:
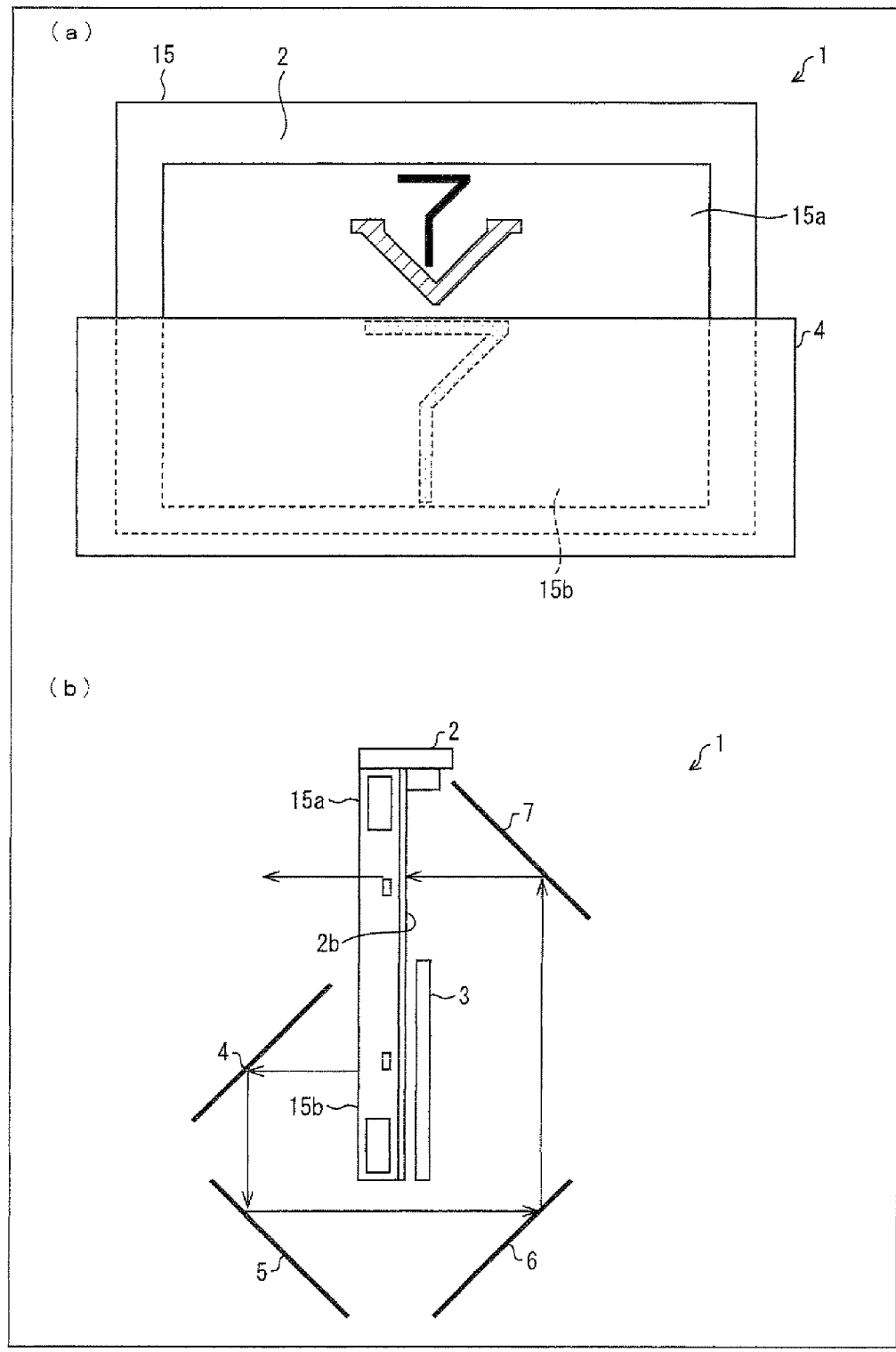
FIG. 3 is a view illustrating the liquid crystal display unit in accordance with the embodiment of the present invention which liquid crystal display unit is being observed in a state where the primary display region and the secondary display region of the first liquid crystal display element provide the primary viewer of the first liquid crystal display element with image display, wherein (a) illustrates the display region of the liquid crystal display unit and (b) schematically illustrates the arrangement of the liquid crystal display unit.

The following description deals in detail with a first embodiment of the present invention by way of example with reference to (a) and (b) of FIG. 1, (a) and (b) of FIG. 2, and (a) and (b) of FIG. 3. Note that dimensions, materials, shapes, relative arrangements and the like of constituents described in the present embodiment are not intended to limit the scope of the present invention unless otherwise specified, and are therefore merely illustrative examples.

Each of a liquid crystal display unit and gaming device according to the embodiment of the present invention (i) carries out, with use of a single liquid crystal display element, a liquid crystal display which allows viewers to have perception of depth, (ii) has a high efficiency in light source use, (iii) readily allows an image to be replaced and a moving image to be displayed, and (iv) can remedy a problem with production cost, a problem with an effect in which an object behind the liquid crystal display element is shielded by the liquid crystal display element, and the problem of luminance unevenness because no polymer-dispersed liquid crystal which has a shutter function is needed to be provided.

(a) and (b) of FIG. 1 each illustrate a case in which (i) an image is displayed in a display region (primary display region) 15a which is directly viewed by a primary viewer of a first liquid crystal display element 2 in a liquid crystal display unit 1; and (ii) total transmission (white display) is carried out in a display region (secondary display region) 15b which causes an image to be projected onto a back surface of the first liquid crystal display element 2. (a) of FIG. 1 is a view illustrating a display region 15 of the liquid crystal display unit 1, and (b) of FIG. 1 is a side view schematically illustrating an arrangement of the liquid crystal display unit 1.

The liquid crystal display unit 1 of the present embodiment includes: the first liquid crystal display element 2 for displaying an image; and a backlight device 3 which is provided behind the first liquid crystal display element 2 and in the secondary display region 15b which causes an image to be projected onto the back surface of the first liquid crystal display element 2.

The liquid crystal display unit 1 further includes reflecting sections for causing light which has been emitted from the liquid crystal display unit 1 in a forward direction (toward the primary viewer) to be emitted, again toward the primary viewer, from behind the liquid crystal display unit 1.

Specifically, the reflecting sections are a plate first mirror 4, a plate second mirror 5, a plate third mirror 6, and a plate fourth mirror 7. An image displayed in the secondary display region 15b of the first liquid crystal display element 2 is first reflected from the first mirror 4, and is then reflected from the second mirror 5 second, the third mirror 6 third, and the fourth mirror 7, in this order, so as to be projected onto the back surface of the first liquid crystal display element 2. The first mirror 4 is at an angle of approximately 90 degrees with the second mirror 5. The third mirror 6 is also at an angle of approximately 90 degrees with the fourth mirror 7.

Each of the mirrors 4, 5, 6, and 7 is at an angle of approximately 45 degrees with the first liquid crystal display element 2.

In view of easy optical design of the reflecting sections, it is preferable that both (i) the angle formed by the first mirror 4 and the second mirror 5 and (ii) the angle formed by the third mirror 6 and the fourth mirror 7 be 90 degrees, and that each of the mirrors 4, 5, 6, and 7 is at an angle of 45 degrees with the first liquid crystal display element 2. The present invention, however, is not limited to this. Thus, any of the above angles can be appropriately adjusted according to need.

The angle at which the first mirror 4 is with the second mirror 5 and the angle at which the third mirror 6 is with the fourth mirror 7 are hence not limited to respective specific ones.

As illustrated in FIG. 1, according to the liquid crystal display unit 1 of the present embodiment, the display region 15 includes the following upper and lower display regions, i.e., the primary display region 15a (see an upper half of (a) of FIG. 1) which is directly viewed by the primary viewer of the first liquid crystal display element 2; and the secondary display region 15b (see a lower half of (a) of FIG. 1) which causes an image to be projected onto the back surface of the first liquid crystal display element 2.

In other words, the present embodiment includes (i) the primary display region (directly viewed display region) 15a, which is directly visible to the primary viewer of the first liquid crystal display element 2 and (ii) the secondary display region (image projecting display region) 15b, which is not directly visible to the viewer.

The backlight device 3 is provided so as to face only a part of the back surface of the first liquid crystal display element 2 which part corresponds to the secondary display region 15b.

The present embodiment further includes the reflecting sections which cause (i) reflection of the light emitted from the first liquid crystal display element 2, particularly from the secondary display region 15b, in the forward direction and (ii) the light to be emitted, again in the forward direction, from behind the first liquid crystal display element 2, particularly from behind the primary display region 15a.

Figure 15:
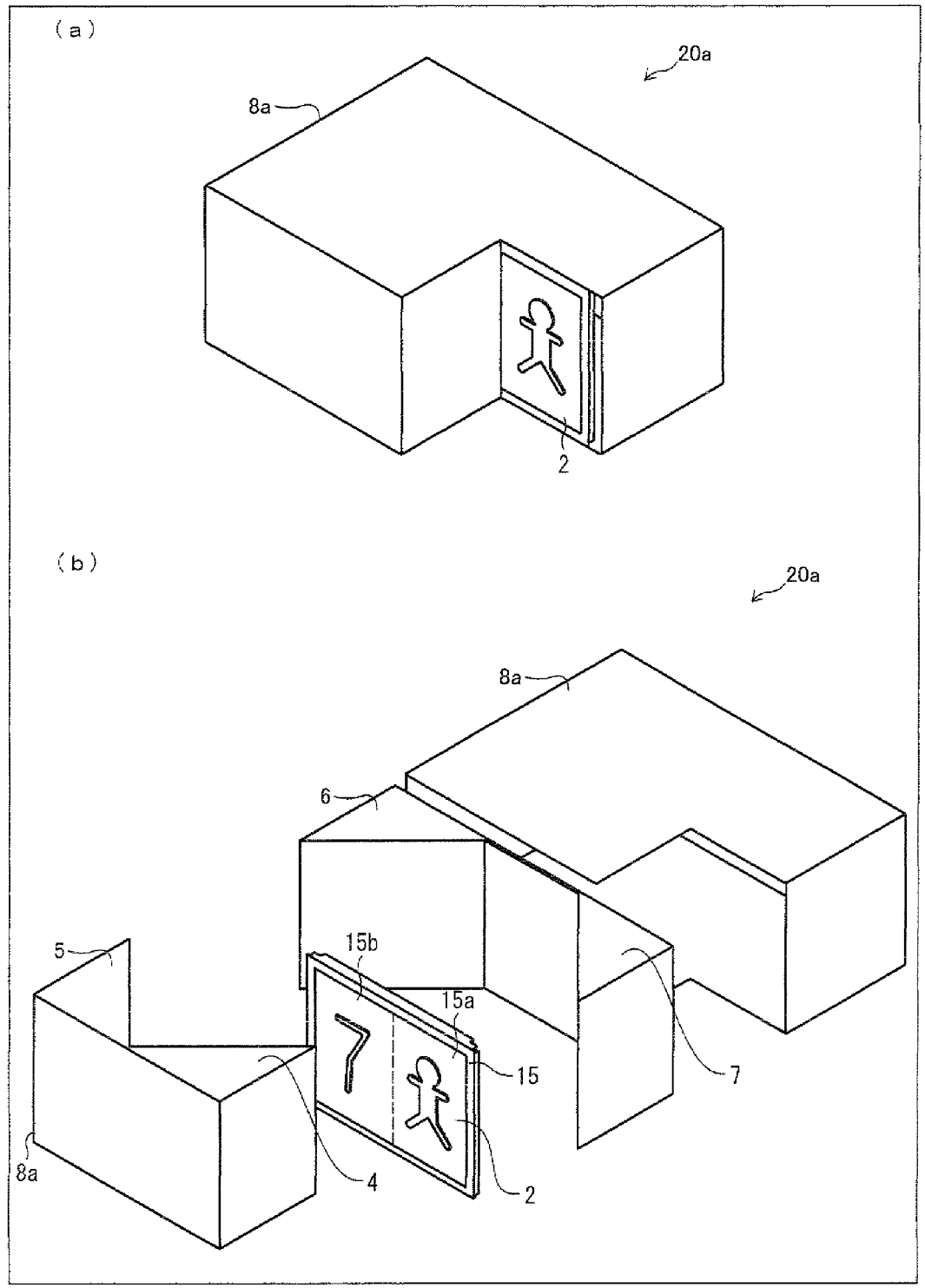
FIG. 15 is a view illustrating a gaming device in accordance with still another embodiment of the present invention which gaming device includes a liquid crystal display unit in which with respect to a primary viewer of the first liquid crystal display element, the primary display region and the secondary display region of the first liquid crystal display element, into which two regions the display region of the first liquid crystal display element is divided, are arranged in a right-and-left direction, wherein (a) is a perspective view illustrating the gaming device and (b) is a perspective view schematically illustrating an arrangement of the gaming device.
Figure 16:
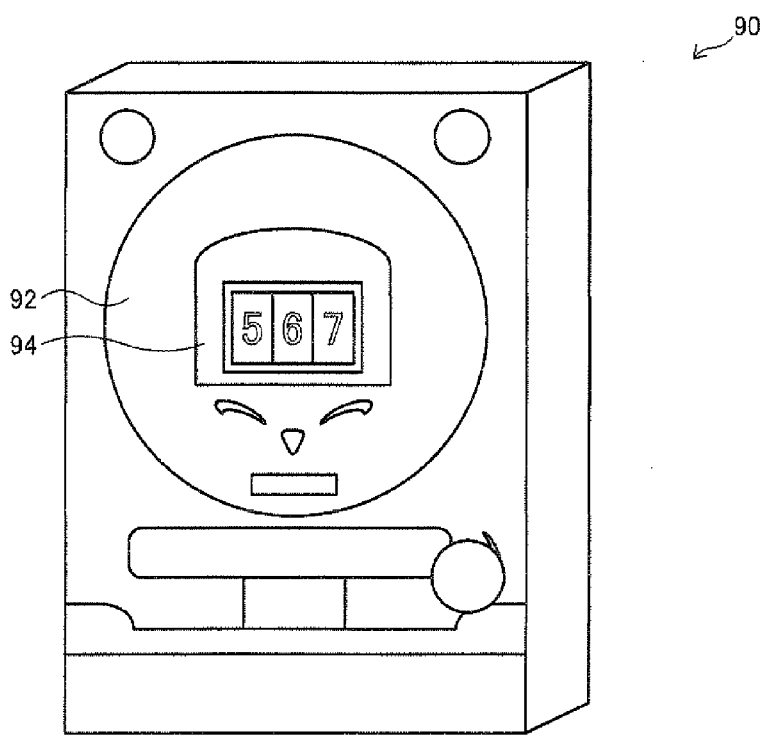
FIG. 16 is a view schematically illustrating an arrangement of a gaming device.
Figure 17:
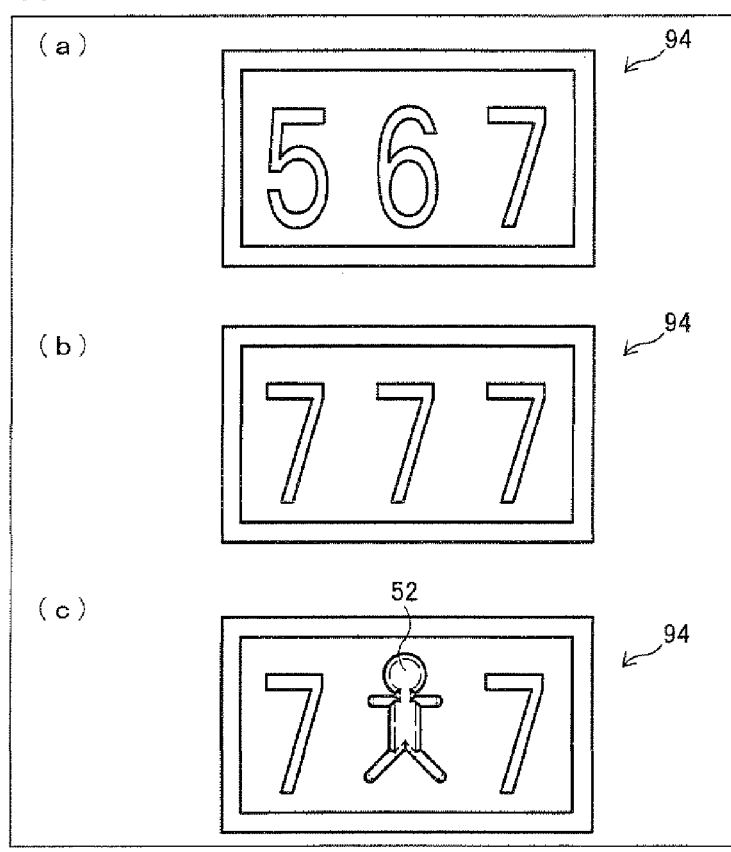
FIG. 17 is a view illustrating an information display section of the gaming device, wherein (a), (b), and (c) each illustrate an example display.
Figure 18:
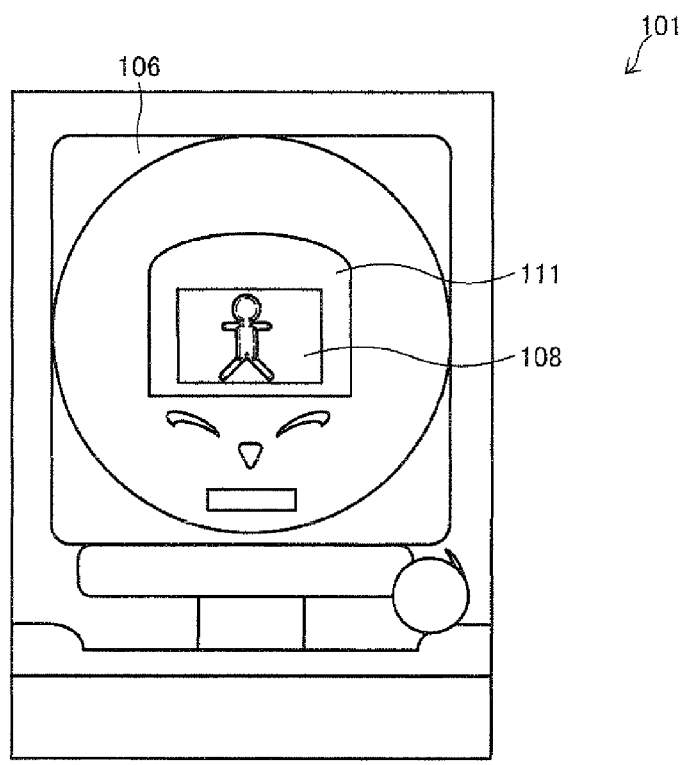
FIG. 18 is an elevational view of conventional art, the view illustrating an arrangement of an entire game machine disclosed in Patent Literature 1.
Figure 19:
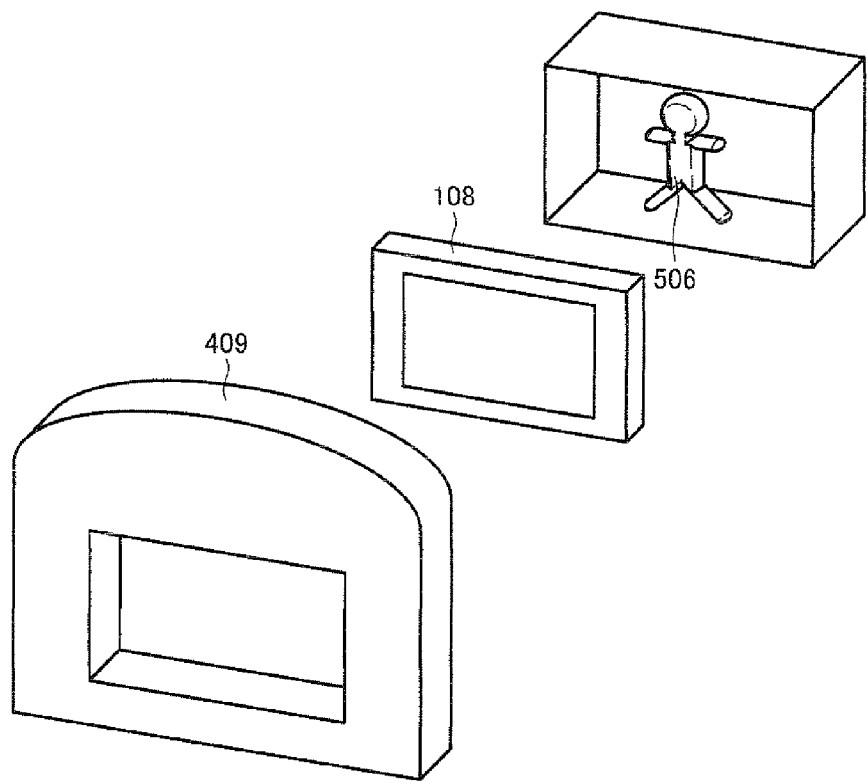
FIG. 19 is an exploded perspective view illustrating an arrangement of a center case of the game machine disclosed in Patent Literature 1.
Figure 20:
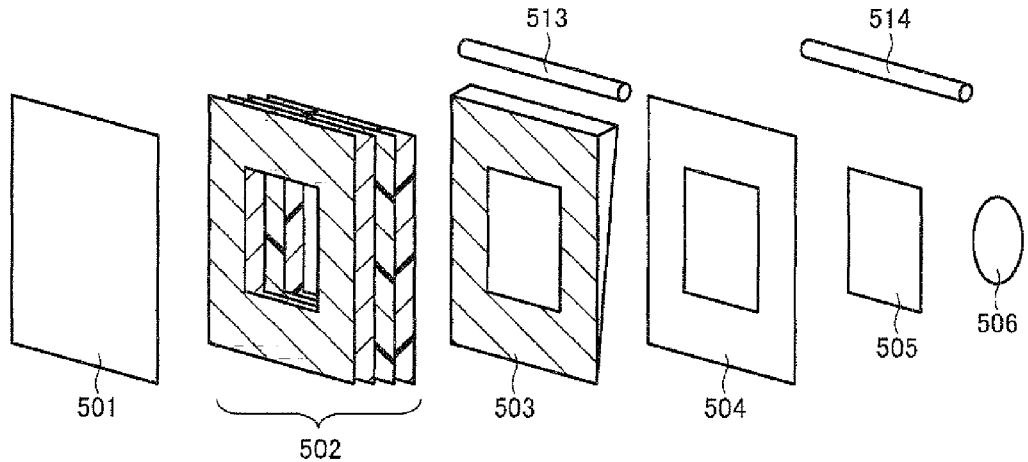
FIG. 20 is an explanatory view illustrating an arrangement of an image display device of the game machine disclosed in Patent Literature 1.
Figure 21:
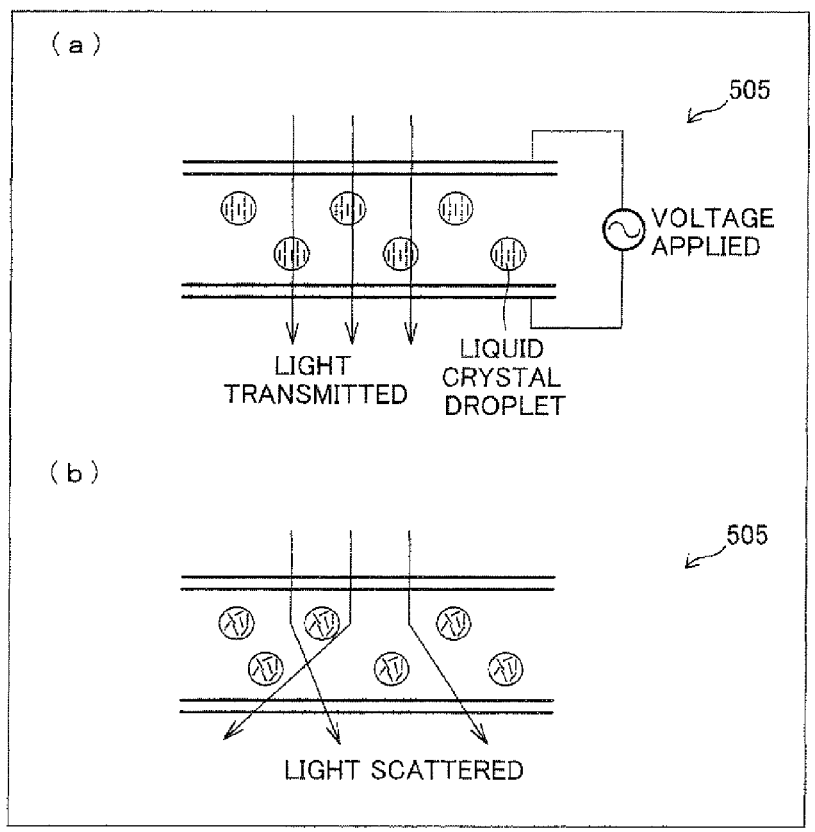
FIG. 21 is an explanatory view illustrating an operating principle of polymer-dispersed liquid crystal serving as a LCD shutter of the game machine disclosed in Patent Literature 1, wherein (a) illustrates how liquid crystal molecules are oriented when a voltage is applied, and (b) illustrates how the liquid crystal molecules are aligned when no voltage is applied.
Figure 22:
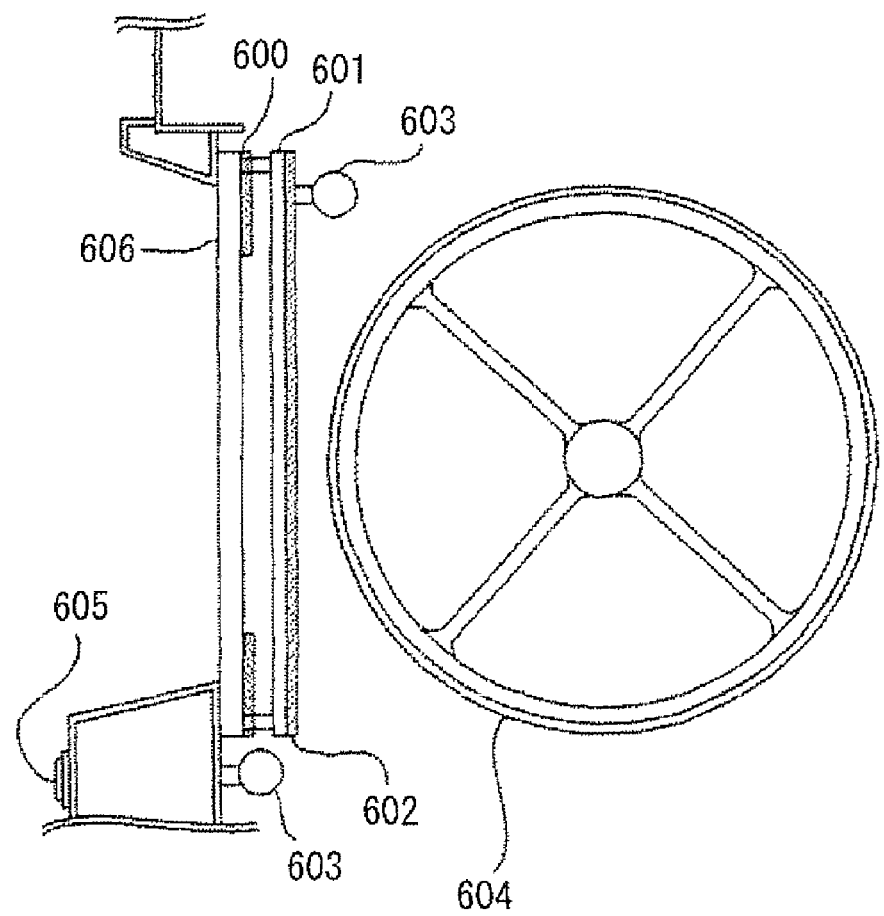
FIG. 22 is a cross-sectional view illustrating a panel display section disclosed in Patent Literature 2.

The present embodiment includes the upper and lower display regions. The arrangement, however, is not limited to this. Instead, right and left display regions can be provided, for example as illustrated in FIG. 15.

The following description deals with the first liquid crystal display element 2 in further detail.

A conventional liquid crystal display panel, which has been commonly used, such as a passive matrix liquid crystal display panel or an active matrix liquid crystal display panel can be employed as the first liquid crystal display element 2. Further, a monochrome liquid crystal display panel or a color liquid crystal display panel can be employed as the first liquid crystal display element 2.

It is preferable that a polarizing plate is further provided on each of front and rear surfaces of the first liquid crystal display element 2.

To display a high-quality and powerful image, the present embodiment employs a liquid crystal display panel, i.e., an active matrix color liquid crystal display panel provided with polarizing plates. The active matrix color liquid crystal display panel includes (i) an active matrix substrate on which a plurality of thin film transistors (TFTs) are provided, (ii) a color filter (CF) substrate facing the active matrix substrate; and a liquid crystal layer which is obtained by sealing, with a sealing material, between the active matrix substrate and the CF substrate.

Note that the liquid crystal display panel of the present embodiment is of a normally white type because the liquid crystal display panel is likely to be used in a total transmission mode.

The following description deals with the backlight device 3 provided behind the first liquid crystal display element 2.

The backlight device 3 of the present embodiment includes a light source, a light guide, a reflecting sheet, and an optical sheet (all not shown).

Specifically, for example, (i) a bar-shaped light source such as a cold cathode fluorescent lamp (CCFL), (ii) a dot-shaped light source such as a side light-emitting type LED, or (iii) a side light-emitting type LED in which R, G, and B chips molded in a single package can be employed as the light source.

The light guide is not particularly limited in kind, shape or the like, provided that it can transform light, emitted from a light source such as a bar-shaped light source or a dot-shaped light source, into light as emitted from a surface light source. The light guide can, for example, have a so-called wedge shape whose thickness is smaller as it is farther away from the light source.

In view of a thickness and luminance uniformity of the liquid crystal display unit 1, the backlight device 3 is preferably a side-light type backlight device.

The light guide can be made of a transparent resin such as acrylic resin, cycloolefin polymer (COP; e.g., Zeonor [product name]), cycloolefin copolymer (COC), or polycarbonate. The present embodiment, however, is not limited to this. The light guide can thus be made of a material which is commonly used as a light guide.

The reflecting sheet is provided in contact with a back surface of the light guide. The reflecting sheet reflects light transmitted through the light guide so as to cause more light to be emitted from a light-emitting surface of the light guide. The reflecting sheet is prepared by, for example, depositing a high-reflectance metal on a resin sheet.

The optical sheet uniformizes and converges light emitted from the light-emitting surface of the light guide. The optical sheet is provided so as to face and substantially entirely cover the light-emitting surface.

More specifically, the optical sheet can be prepared by stacking an appropriate combination of, for example, a diffusing plate for diffusing light emitted from the light-emitting surface; a diffusing sheet for simultaneously converging and scattering incident light; a lens sheet for converging incident light so as to improve luminance in a forward direction (i.e., in a normal line direction of the light-emitting surface); and a polarizing and reflecting sheet for improving luminance of the liquid crystal display device by reflecting one of polarized light components of incident light and transmitting the other of the polarized light components. The combination is preferably determined, by taking into consideration an intended price and/or performance of the liquid crystal display device.

The use of the optical sheet allows improvements in (i) luminance of the backlight device 3 and (ii) in-plane uniformity of the luminance.

The following description deals in further detail with the reflecting sections for projecting an image, displayed by the first liquid crystal display element 2, onto the back surface of the first liquid crystal display element 2.

In view of luminance, image quality and the like, it is preferable that a mirror, which reflects light in a visible range, such as a plate-shaped mirror, a curved mirror, or a spherical mirror on each of which a high-reflectance material (e.g., a metal such as silver) is applied or deposited is employed as the reflecting sections. Each of the reflecting sections, however, is not limited in material or shape to the specific one.

The reflecting sections are preferably provided so that light emitted from the emission side polarizing plate provided on the front surface of the first liquid crystal display element 2 has a polarization axis which coincides with a polarization axis of the incident side polarizing plate provided on the rear surface of the first liquid crystal display element 2.

With the above arrangement, it is possible to provide a liquid crystal display unit 1 which is higher in luminance and efficiency in light source use.

The number of the reflecting sections in the liquid crystal display unit 1 is not particularly limited. Further, neither the angles at which the respective reflecting sections are with the first liquid crystal display element 2 nor the angles at which the plate-shaped mirrors are with each other are particularly limited. The number and the angles, however, are preferably determined by taking into consideration factors such as facility in optical design, efficiency in light source use, and quality of an image to be projected onto the back surface of the first liquid crystal display element 2.

The present embodiment employs, as the reflecting sections, mirrors each having a surface on which a high-reflectance metal is formed.

The present embodiment includes four mirrors each at an angle of 45 degrees with the first liquid crystal display element 2 so that the polarization axis of light emitted from the emission side polarizing plate provided on the front surface of the first liquid crystal display element 2 coincides with the polarization axis of the incident side polarizing plate provided on the rear surface the first liquid crystal display element 2.

The following description assumes that an image displayed by the first liquid crystal display element 2 is reflected from the first mirror 4, the second mirror 5, the third mirror 6, and the fourth mirror 7, in this order, which fourth mirror 7 returns the light, that has been reflected from the first through third mirrors, to the first liquid crystal display element 2.

With reference to (a) and (b) of FIG. 1, (a) and (b) of FIG. 2, and (a) and (b) of FIG. 3, the following description deals with a display mechanism of the liquid crystal display unit 1 in the present embodiment.

(a) and (b) of FIG. 1 each illustrate a case in which with respect to a primary viewer of the first liquid crystal display element 2, (i) an image is displayed in the primary display region 15a, and (ii) total transmission (white display) is carried out in the secondary display region 15b of the first liquid crystal display element 2. (a) of FIG. 1 illustrates the display region 15 of the liquid crystal display unit 1, and (b) of FIG. 1 is a view schematically illustrating the arrangement of the liquid crystal display unit 1.

As illustrated in FIG. 1, according to the liquid crystal display unit 1 of the present embodiment, the display region 15 includes the following two upper and lower display regions with respect to the primary viewer of the first liquid crystal display element 2: the primary display region 15a (see the upper half of (a) of FIG. 1) and the secondary display region 15b (see the lower half of (a) of FIG. 1) of the first liquid crystal display element 2.

With the arrangement, the letter "V" can be normally displayed (i.e., displayed without allowing viewers to have perception of depth) in the display region 15 of the liquid crystal display unit 1 by an arrangement in which (i) the letter "V" is displayed in the primary display region 15a (upper display region) of the first liquid crystal display element 2 and (ii) total transmission (white display) is carried out in the secondary display region 15b (lower display region), behind which the backlight device 3 is provided, of the first liquid crystal display element 2 so that the light transmitted through (i.e., emitted from) the secondary display region 15b (lower display region) is emitted toward a back surface of the primary display region 15a (upper display region) with use of the mirrors 4, 5, 6, and 7 serving as the reflecting sections.

In other words, the light from the backlight device 3 provided behind the secondary display region 15b is used for the display in the primary display region 15a.

(a) and (b) of FIG. 2 each illustrate a case in which with respect to the primary viewer of the first liquid crystal display element 2, (i) total transmission (white display) is carried out in the primary display region 15a, and (ii) an image is displayed in the secondary display region 15b of the first liquid crystal display element 2. (a) of FIG. 2 is a view illustrating the display region 15 of the liquid crystal display unit 1, and (b) of FIG. 2 is a view schematically illustrating the arrangement of the liquid crystal display unit 1.

In other words, (a) and (b) of FIG. 2 each illustrate a case in which only a projected image is displayed in the primary display region 15a (upper display region) of the liquid crystal display unit 1.

The number "7" can be displayed in the primary display region 15a (upper display region) of the liquid crystal display unit 1 by an arrangement in which (i) total transmission (white display) is carried out in the primary display region 15a (upper display region) of the first liquid crystal display element 2 so that an image projected from behind the primary display region 15a transmits the primary display region 15a and (ii) the number "7" is displayed in the secondary display region 15b (lower display region), behind which the backlight device 3 is provided, of the first liquid crystal display element 2 so that the image displayed in the secondary display region 15b (lower display region) is projected onto the back surface of the primary display region 15a (upper display region) of the first liquid crystal display element 2 with use of the mirrors 4, 5, 6, and 7 serving as the reflecting sections.

According to the arrangement, an image displayed by the first liquid crystal display element 2 is projected, without change, onto the back surface of the first liquid crystal display element 2. Thus, the liquid crystal display unit 1 not only has a high efficiency in light source use, but also readily allows an image to be replaced and a moving image to be displayed simply by changing a display signal. This provides a significant advantage as compared to conventional arrangements employing accessories.

In addition, by switching a display state of the secondary display region 15b (lower display region) of the first liquid crystal display element 2 between image display and total transmission (white display), it is possible to simply and easily switch the primary display region 15a between (i) a state in which an image is displayed and (ii) a state in which no image is displayed.

(a) and (b) of FIG. 3 each illustrate a case in which the primary display region 15a and the secondary display region 15b of the first liquid crystal display element 2 provide the primary viewer of the first liquid crystal display element 2 with image display. (a) of FIG. 3 is a view illustrating the display region 15 of the liquid crystal display unit 1, and (b) of FIG. 3 is a view schematically illustrating the arrangement of the liquid crystal display unit 1.

The letter "V" which is a normal image and the number "7" which is a projected image can be simultaneously displayed in the primary display region 15a (upper display region) of the liquid crystal display unit 1, by (i) causing the letter "V" to be displayed in the primary display region 15a (upper display region) of the first liquid crystal display element 2, (ii) causing the number "7" to be displayed in the secondary display region 15b (lower display region) of the first liquid crystal display element 2, and (iii) the number "7" displayed in the secondary display region 15b (lower display region) to be projected so that the number "7" and the letter "V" displayed in the primary display region 15a (upper display region) do not overlap each other.

The arrangement allows the primary viewer of the first liquid crystal display element 2 to perceive that the number "7" which is the projected image is behind the letter "V" which is the normal image. The above arrangement thus makes it possible to carry out a display which allows viewers to have perception of depth.

In other words, it is possible to provide a liquid crystal display unit 1 which can carry out, with use of a single first liquid crystal display element 2, a liquid crystal display which allows viewers to have perception of depth.

Embodiment 2

Figure 4:
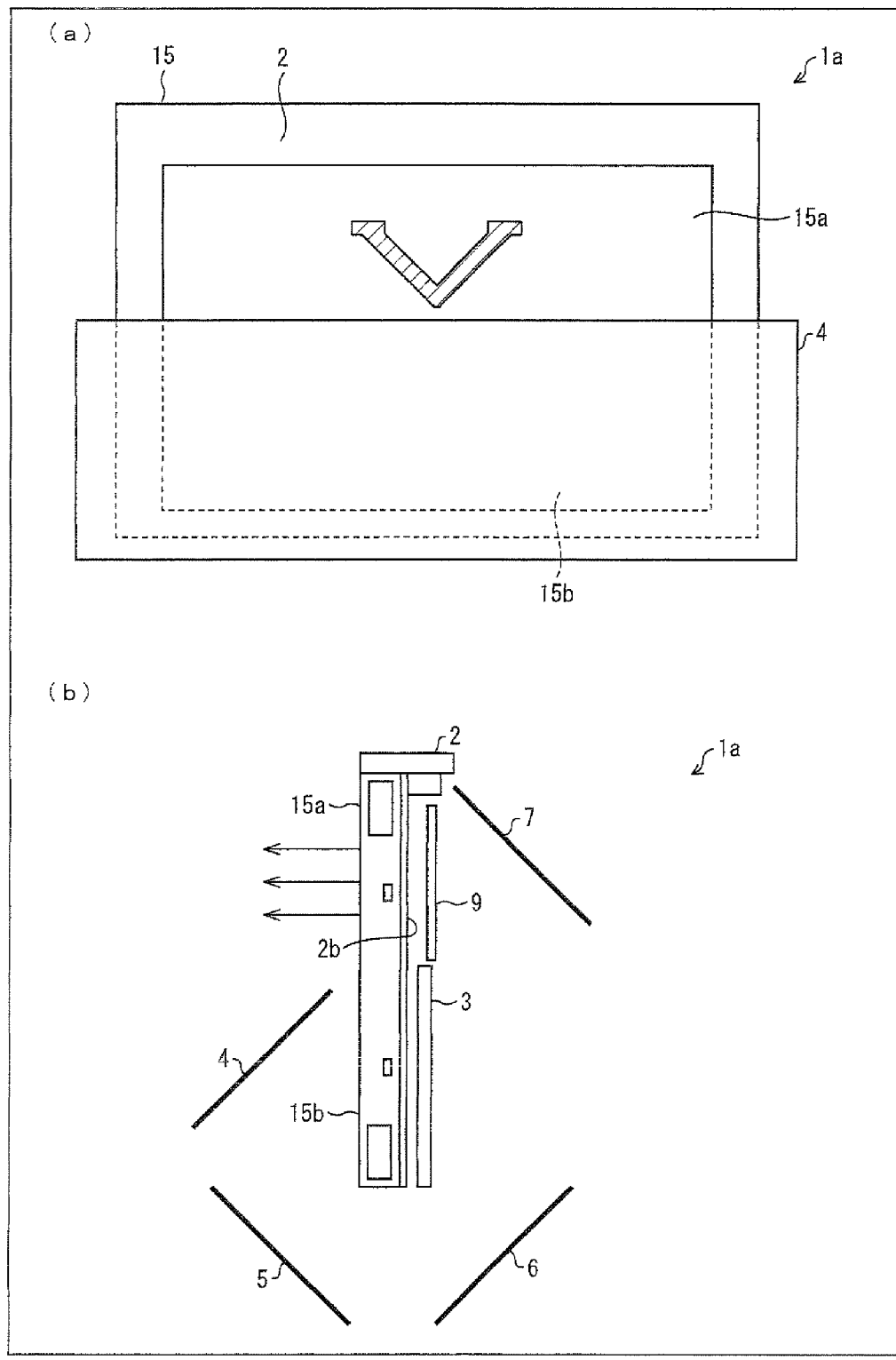
FIG. 4 is a view illustrating a liquid crystal display unit in accordance with another embodiment of the present invention which liquid crystal display unit is being observed in a state where with respect to a primary viewer of the first liquid crystal display element, (i) an image is displayed in the primary display region and (ii) total transmission (white display) is carried out in the secondary display region of the first liquid crystal display element, wherein (a) illustrates the display region of the liquid crystal display unit and (b) schematically illustrates an arrangement of the liquid crystal display unit.
Figure 5:
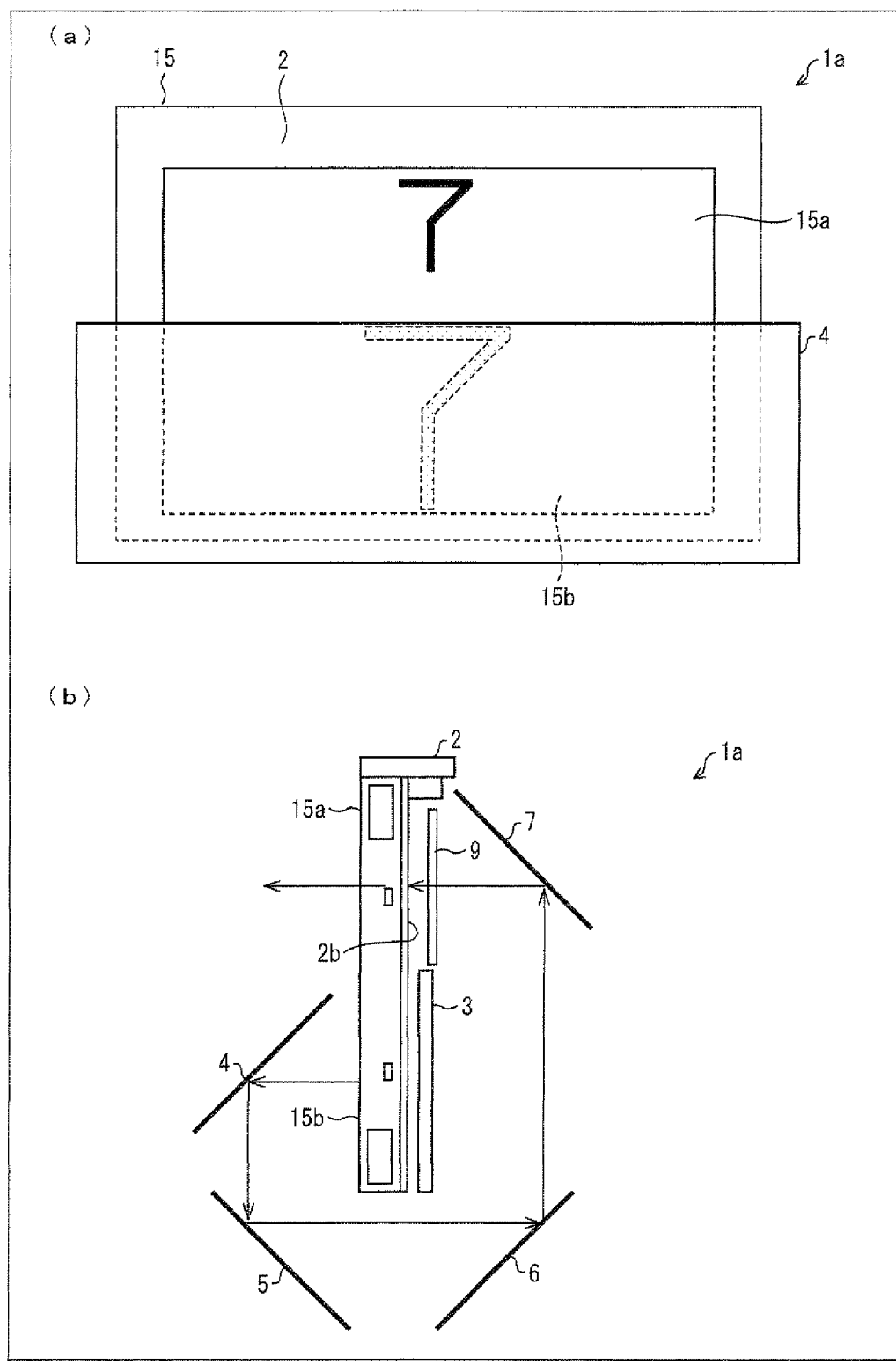
FIG. 5 is a view illustrating the liquid crystal display unit in accordance with the embodiment of the present invention which liquid crystal display unit is being observed in a state where with respect to the primary viewer of the first liquid crystal display element, (i) total transmission (white display) is carried out in the primary display region and (ii) an image is displayed in the secondary display region of the first liquid crystal display element, wherein (a) illustrates the display region of the liquid crystal display unit and (b) schematically illustrates the arrangement of the liquid crystal display unit.
Figure 6:
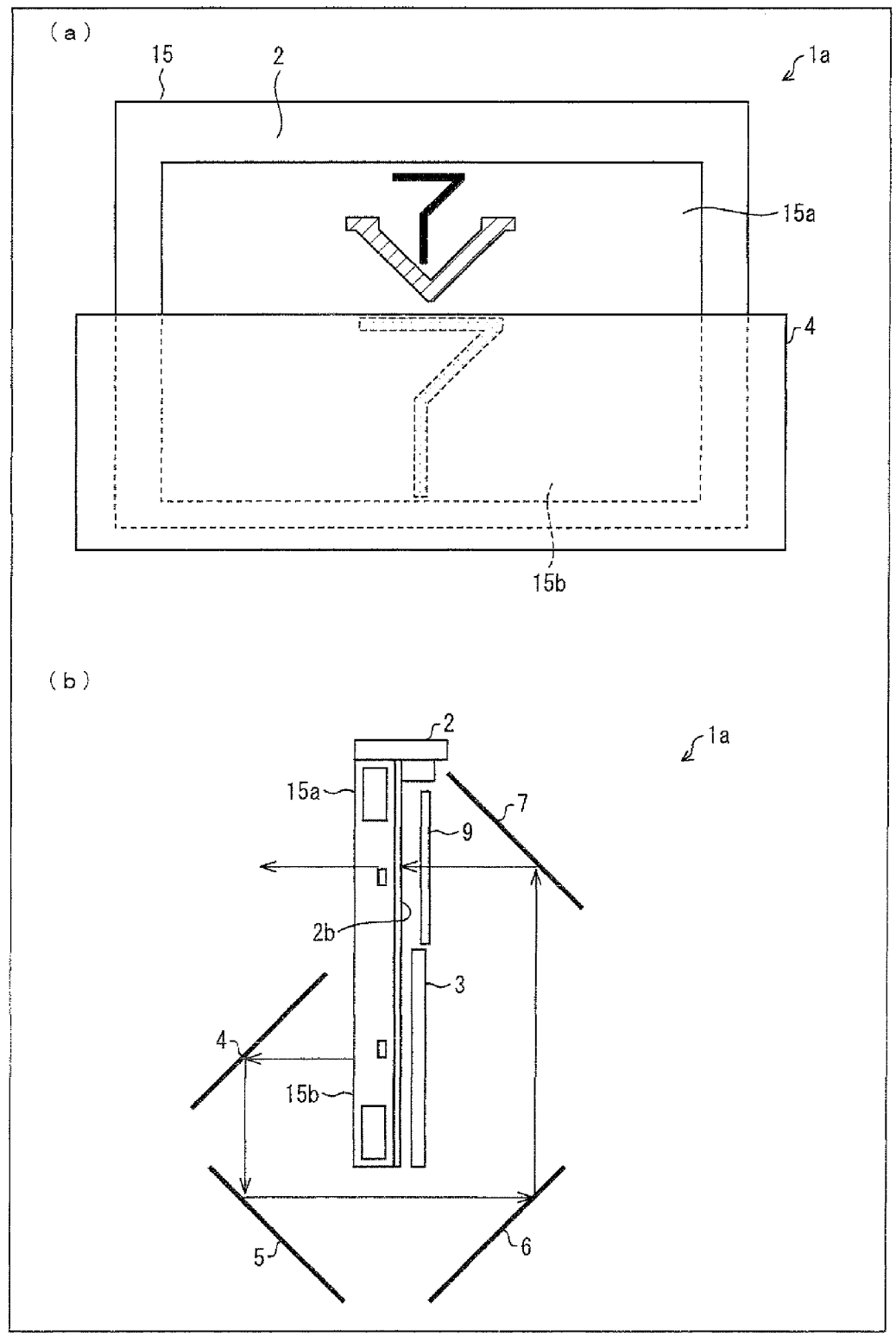
FIG. 6 is a view illustrating the liquid crystal display unit in accordance with the embodiment of the present invention which liquid crystal display unit is being observed in a state where the primary display region and the secondary display region of the first liquid crystal display element provide the primary viewer of the first liquid crystal display element with image display, wherein (a) illustrates the display region of the liquid crystal display unit and (b) schematically illustrates the arrangement of the liquid crystal display unit.

The following description deals with a second embodiment of the present invention with reference to (a) and (b) of FIG. 4, (a) and (b) of FIG. 5, and (a) and (b) of FIG. 6. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) and (b) of FIG. 4 each illustrate a case in which with respect to a primary viewer of the first liquid crystal display element 2, (i) an image is displayed in the primary display region 15a, and (ii) total transmission (white display) is carried out in the secondary display region 15b of the first liquid crystal display element 2. (a) of FIG. 4 illustrates the display region 15 of a liquid crystal display unit 1a, and (b) of FIG. 4 is a view schematically illustrating an arrangement of the liquid crystal display unit 1a.

Note that the liquid crystal display unit 1a of the present embodiment includes, behind the primary display region 15a, a polymer-dispersed liquid crystal display element 9 which has a scattering function and serves as a second liquid crystal display element.

As illustrated in FIG. 4, the letter "V" can be normally displayed (i.e., displayed without allowing viewers to have perception of depth) in the primary display region 15a (upper display region) of the liquid crystal display unit 1a by an arrangement in which (i) the letter "V" is displayed in the primary display region 15a (upper display region) of the first liquid crystal display element 2 and (ii) total transmission (white display) is carried out in the secondary display region 15b (lower display region), behind which the backlight device 3 is provided, of the first liquid crystal display element 2 so that the light transmitted through the secondary display region 15b (lower display region) of the first liquid crystal display element 2 is guided to the polymer-dispersed liquid crystal display element 9 with use of the mirrors 4, 5, 6, and 7 serving as the reflecting sections.

During the above operation, the present embodiment causes the polymer-dispersed liquid crystal display element 9 to be in a scattering state. The polymer-dispersed liquid crystal display element 9 in the scattering state causes the light emitted from the secondary display region 15b to have in-plane luminance uniformity. This causes a display having a higher in-plane luminance uniformity to be easily carried out in the primary display region 15a (upper display region) of the first liquid crystal display element 2.

(a) and (b) of FIG. 5 each illustrate a case in which with respect to the primary viewer of the first liquid crystal display element 2, (i) total transmission (white display) is carried out in the primary display region 15a, and (ii) an image is displayed in the secondary display region 15b of the first liquid crystal display element 2. (a) of FIG. 5 illustrates the display region 15 of the liquid crystal display unit 1a, and (b) of FIG. 5 is a view schematically illustrating the arrangement of the liquid crystal display unit 1a.

In other words, (a) and (b) of FIG. 5 each illustrate a case in which only a projected image is displayed in the primary display region 15a (upper display region) of the liquid crystal display unit 1a.

The number "7" which is a projected image can be displayed in the primary display region 15a (upper display region) of the liquid crystal display unit 1a by causing both the primary display region 15a (upper display region) of the first liquid crystal display element 2 and the polymer-dispersed liquid crystal display element 9 to be set to a transmitting state so that an image projected from behind each of the primary display region 15a and the polymer-dispersed liquid crystal display element 9 is transmitted.

Further, the number "7" is displayed in the secondary display region 15b (lower display region), behind which the backlight device 3 is provided, of the first liquid crystal display element 2. Consequently, the image displayed in the secondary display region 15b (lower display region) of the first liquid crystal display element 2 is projected onto the primary display region 15a (upper display region) of the first liquid crystal display element 2 with use of the mirrors 4, 5, 6, and 7 serving as the reflecting sections.

(a) and (b) of FIG. 6 each illustrate a case in which the primary display region 15a and the secondary display region 15b of the first liquid crystal display element 2 provide the primary viewer of the first liquid crystal display element 2 with image display. (a) of FIG. 6 illustrates the display region 15 of the liquid crystal display unit 1a, and (b) of FIG. 6 is a view schematically illustrating the arrangement of the liquid crystal display unit 1a.

The letter "V" which is a normal image and the number "7" which is a projected image can be simultaneously displayed in the primary display region 15a (upper display region) of the liquid crystal display unit 1a by (i) causing the letter "V" to be displayed in the primary display region 15a (upper display region) of the first liquid crystal display element 2, (ii) the number "7" to be displayed in the secondary display region 15b (lower display region), and (iii) the number "7" to be displayed in the secondary display region 15b (lower display region) is projected so that the number "7" projected onto the primary display region 15a (upper display region) do not overlap the letter "V".

During the above operation, the polymer-dispersed liquid crystal display element 9 is in the transmitting state so that the image projected from behind the polymer-dispersed liquid crystal display element 9 is transmitted.

The above arrangement can provide the primary viewer of the first liquid crystal display element 2 with perception that the projected image of the number "7" is behind the normally displayed image of the letter V. The above arrangement thus makes it possible to carry out a display which provide viewers with perception of depth.

In other words, it is possible to provide a liquid crystal display unit 1a which can carry out, with use of a single first liquid crystal display element 2, a liquid crystal display which provide viewers with perception of depth.

It is possible to provide a liquid crystal display unit 1a which has a higher luminance uniformity, by arranging it so that the polymer-dispersed liquid crystal display element 9 is additionally provided.

In the present embodiment, the polymer-dispersed liquid crystal display element 9 is used not as a shielding section as conventional, but as a section for further improving luminance uniformity of the backlight reflected from the mirrors 4, 5, 6, and 7 serving as the reflecting sections.

In other words, the polymer-dispersed liquid crystal display element 9 in the scattering state is used as a diffusing plate so as to improve the luminance uniformity.

Embodiment 3

Figure 7:
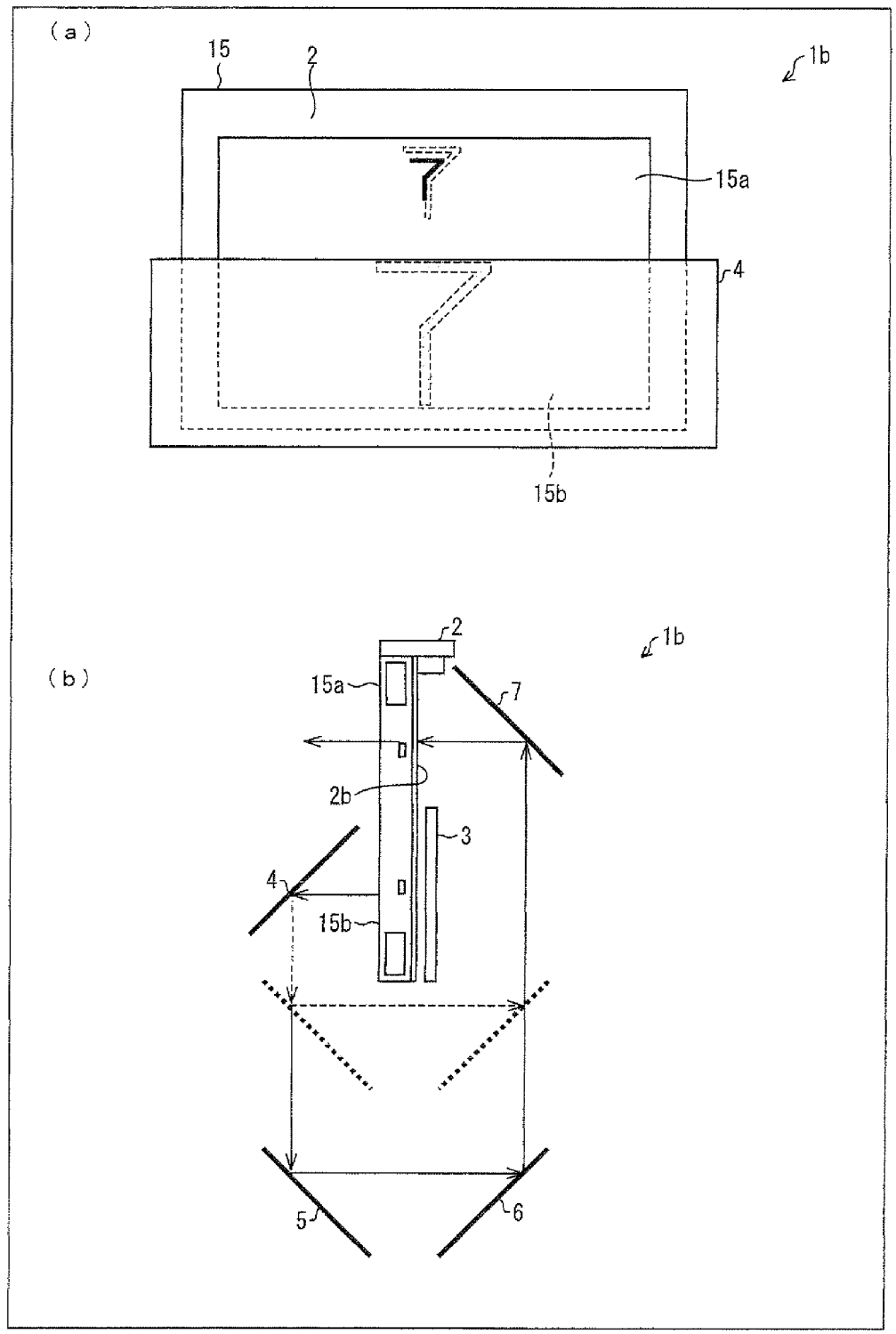
FIG. 7 is a view illustrating a liquid crystal display unit in accordance with still another embodiment of the present invention which liquid crystal display unit is being observed in a state where with respect to a primary viewer of the first liquid crystal display element, (i) total transmission (white display) is carried out in the primary display region and (ii) an image is displayed in the secondary display region of the first liquid crystal display element, wherein (a) illustrates the display region of the liquid crystal display unit and (b) schematically illustrates an arrangement of the liquid crystal display unit.

The following description deals with a third embodiment of the present invention with reference to (a) and (b) of FIG. 7. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) and (b) of FIG. 7 each illustrate a case in which with respect to a primary viewer of the first liquid crystal display element 2, (i) total transmission (white display) is carried out in the primary display region 15a, and (ii) an image is displayed in the secondary display region 15b of the first liquid crystal display element 2. (a) of FIG. 7 illustrates the display region 15 of a liquid crystal display unit 1b, and (b) of FIG. 7 is a view schematically illustrating an arrangement of the liquid crystal display unit 1b.

The liquid crystal display unit 1b of the present embodiment is characterized in that the mirrors 4, 5, 6, and 7 of the reflecting sections are respective movable mirrors.

By changing locations of the movable mirrors, it is possible to change a length of an optical path of the light emitted from the secondary display region 15b, which optical path extends from a front surface of the secondary display region 15b to a back surface of the primary display region 15a.

(a) and (b) of FIG. 7 each illustrate a case in which only a changed projection image, whose reflection distance has been changed by the movable mirrors, is displayed in the primary display region 15a (upper display region) of the liquid crystal display unit 1b.

The number "7" which is a changed projection image having a reflection distance that has been changed by the movable mirrors, can be displayed in the primary display region 15a (upper display region) of the liquid crystal display unit 1b by first causing total transmission (white display) to be carried out in the primary display region 15a (upper display region) of the first liquid crystal display element 2 so that an image projected from behind the primary display region 15a is transmitted.

Then, the number "7" is caused to be displayed in the secondary display region 15b (lower display region), behind which the backlight device 3 is provided, of the first liquid crystal display element 2. Consequently, the image displayed in the secondary display region 15b (lower display region) is projected onto the primary display region 15a (upper display region) of the first liquid crystal display element 2 with use of the mirrors 4, 5, 6, and 7 serving as the reflecting sections.

According to the arrangement, by partially changing the locations of the mirrors 4, 5, 6, and 7 serving as the reflecting sections, it is possible to change the reflection distance of an image which is displayed by the first liquid crystal display element 2 and is projected onto the back surface of the first liquid crystal display element 2. Consequently, by changing the optical path length, the liquid crystal display unit 1b can easily change perception of depth in a display image or provide greater perception of depth to a display image.

Specifically, as illustrated in (b) of FIG. 7, it is possible that the second mirror 5 and the third mirror 6, out of the mirrors 4, 5, 6, and 7 which serve as the reflecting sections, are movable mirrors, for example. By causing the mirrors 5 and 6 to move so that the reflection distance (optical path length) is longer, it is possible to, as compared to the previous display (i.e., the number "7" shown by a dotted line in (a) of FIG. 7), provide greater perception of depth to a display image.

Embodiment 4

Figure 8:
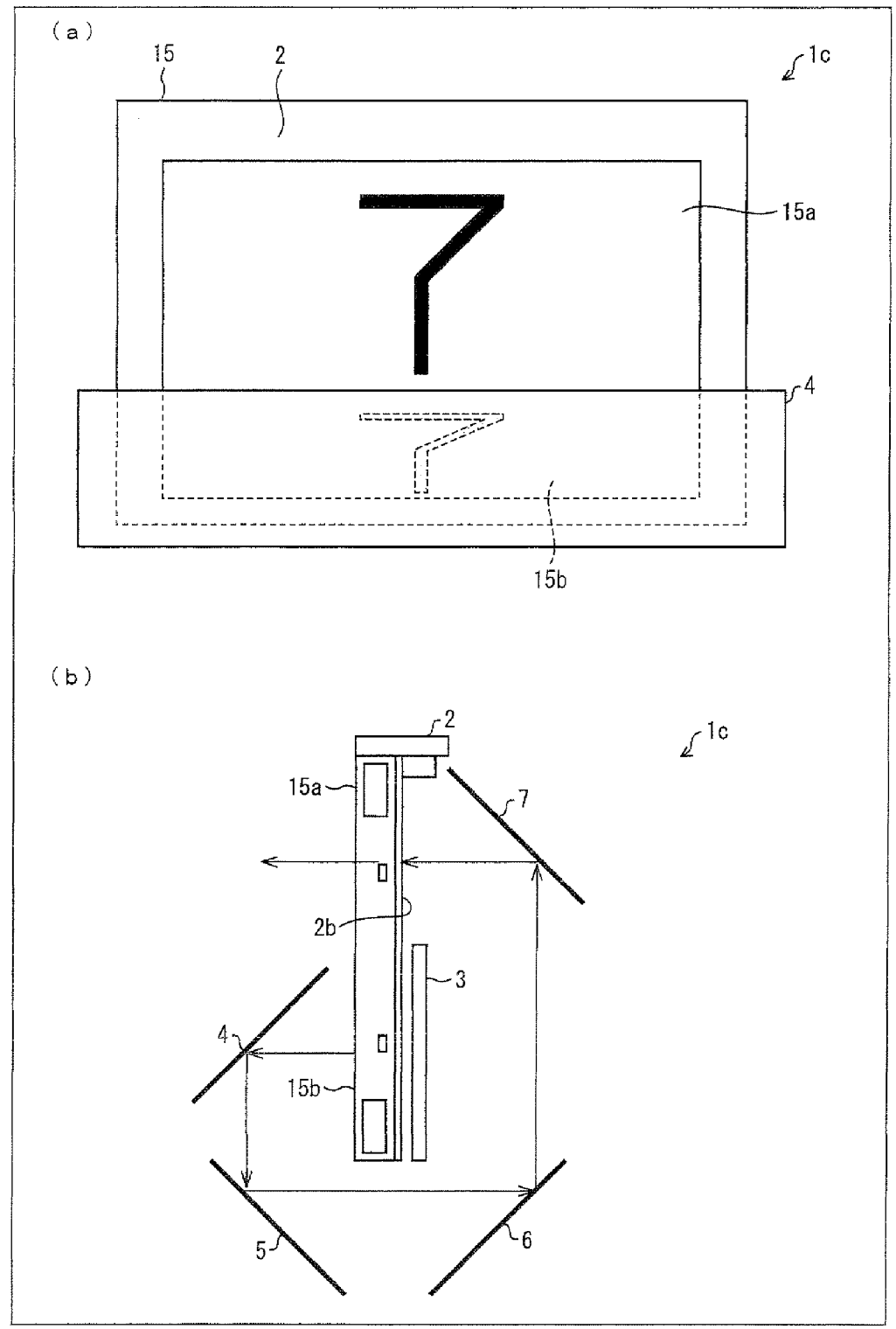
FIG. 8 is a view illustrating a liquid crystal display unit in accordance with still another embodiment of the present invention which liquid crystal display unit is being observed in a state where with respect to a primary viewer of the first liquid crystal display element, (i) total transmission (white display) is carried out in the primary display region and (ii) an image is displayed in the secondary display region of the first liquid crystal display element, wherein (a) illustrates the display region of the liquid crystal display unit and (b) schematically illustrates an arrangement of the liquid crystal display unit.

The following description deals with a fourth embodiment of the present invention with reference to (a) and (b) of FIG. 8. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) and (b) of FIG. 8 each illustrate a case in which with respect to a primary viewer of the first liquid crystal display element 2, (i) total transmission (white display) is carried out in the primary display region 15a, and (ii) an image is displayed in the secondary display region 15b of the first liquid crystal display element 2. (a) of FIG. 8 illustrates the display region 15 of a liquid crystal display unit 1c, and (b) of FIG. 8 is a view schematically illustrating an arrangement of the liquid crystal display unit 1c.

Out of the mirrors 4, 5, 6, and 7 which serve as the reflecting sections of the present embodiment, the first mirror 4, which first reflects an image displayed by the first liquid crystal display element 2, has an inclined angle different from those in the embodiments 1 through 3. Specifically, as illustrated in FIG. 8(b), the first mirror 4 is inclined at an angle which is closer to horizontal than those in the embodiments 1 through 3.

The first mirror 4 may have the inclined angle which is variable or is fixed at a particular angle.

(a) and (b) of FIG. 8 each illustrate a case in which only a changed projection image, whose reflection angle has been changed by the movable mirrors, is displayed in the primary display region 15a (upper display region) of the liquid crystal display unit 1c.

The number "7" which is a changed projection image resulting from a change in the inclination angle of the movable first mirror 4, can be displayed in the primary display region 15a (upper display region) of the liquid crystal display unit 1c by first causing total transmission (white display) to be carried out in the primary display region 15a (upper display region) of the first liquid crystal display element 2 so that an image projected from behind the primary display region 15a is transmitted.

Then, the number "7" is caused to be displayed in the secondary display region 15b (lower display region), behind which the backlight device 3 is provided, of the first liquid crystal display element 2. Consequently, the image displayed in the secondary display region 15b (lower display region) is projected onto the primary display region 15a (upper display region) of the first liquid crystal display element 2 with use of the mirrors 4, 5, 6, and 7 serving as the reflecting sections.

According to the present embodiment, out of the mirrors 4, 5, 6, and 7, the first mirror 4, which first reflects an image displayed by the first liquid crystal display element 2, has a variable angle.

With the arrangement, even in a case where an image, which is displayed by the first liquid crystal display element 2 and is projected onto the back surface of the first liquid crystal display element 2, has a compressed shape, it is possible to change a rate of the compression in accordance with an angle at which the image is reflected from the mirror 4. It is therefore possible to provide a liquid crystal display unit 1c in which the primary display region 15a is enlarged for the primary viewer of the first liquid crystal display element 2.

On this account, since the primary display region 15a (upper display region) of the first liquid crystal display element 2 is made larger than the secondary display region 15b (lower display region), a display image to be projected onto the back surface of the first liquid crystal display element 2 becomes smaller, accordingly. The display image which has become smaller can be changed into an image of a normal size by adjusting the inclined angle of the mirror 4.

In other words, as illustrated in (a) and (b) of FIG. 8, even in the case where the primary display region 15a is made larger whereas the secondary display region 15b is made smaller, an image displayed in the secondary display region 15b can be enlarged and displayed in substantially the entire primary display region 15a.

Note that, according to the present embodiment, it is the first mirror 4 that has a variable inclined angle. The present invention, however, is not limited to this. Instead, the other mirror(s) can have a variable inclined angle.

Embodiment 5

Figure 9:
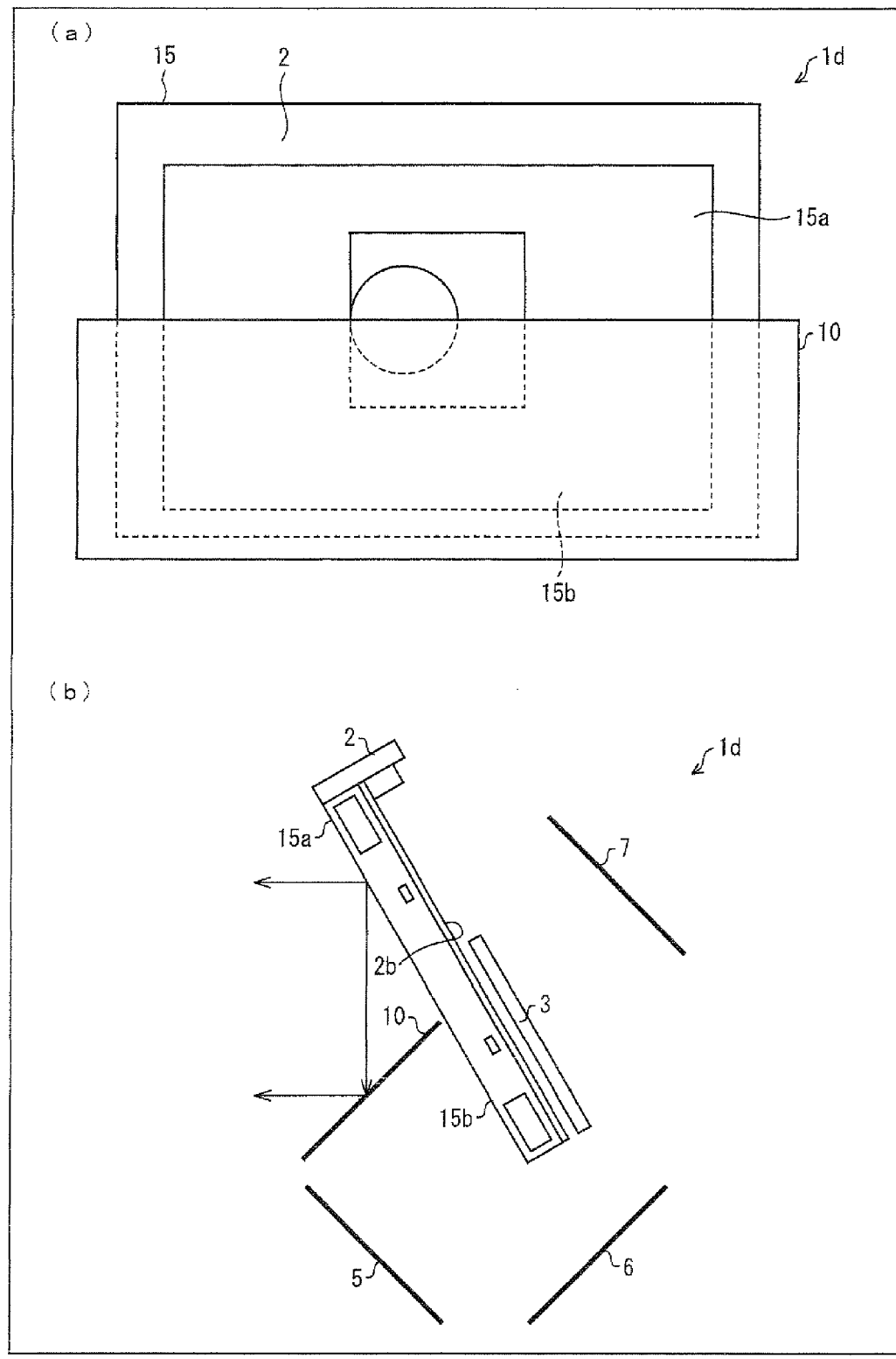
FIG. 9 is a view illustrating a liquid crystal display unit in accordance with still another embodiment of the present invention which liquid crystal display unit is being observed in a state where with respect to a primary viewer of the first liquid crystal display element, (i) an image is displayed in the primary display region and (ii) total transmission (white display) is carried out in the secondary display region of the first liquid crystal display element, wherein (a) illustrates the display region of the liquid crystal display unit and (b) schematically illustrates an arrangement of the liquid crystal display unit.
Figure 10:
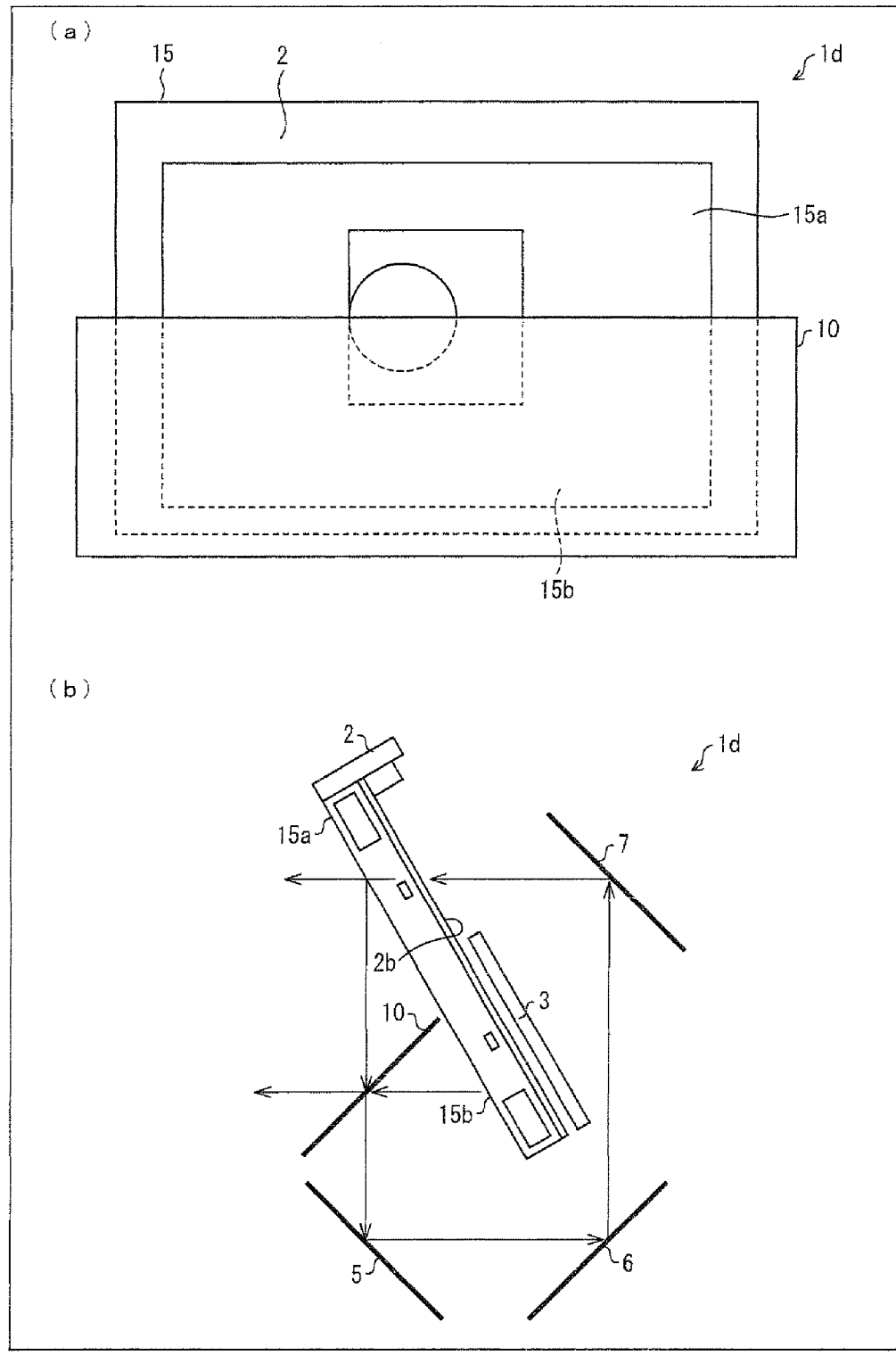
FIG. 10 is a view illustrating the liquid crystal display unit in accordance with the embodiment of the present invention which liquid crystal display unit is being observed in a state where with respect to the primary viewer of the first liquid crystal display element, (i) total transmission (white display) is carried out in the primary display region and (ii) an image is displayed in the secondary display region of the first liquid crystal display element, wherein (a) illustrates the display region of the liquid crystal display unit and (b) schematically illustrates the arrangement of the liquid crystal display unit.

The following description deals with a fifth embodiment of the present invention with reference to (a) and (b) of FIG. 9 and (a) and (b) of FIG. 10. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) and (b) of FIG. 9 each illustrate a case in which with respect to a primary viewer of the first liquid crystal display element 2, (i) an image is displayed in the primary display region 15a, and (ii) total transmission (white display) is carried out in the secondary display region 15b of the first liquid crystal display element 2. (a) of FIG. 9 illustrates the display region 15 of a liquid crystal display unit 1d, and (b) of FIG. 9 is a view schematically illustrating an arrangement of the liquid crystal display unit 1d.

The present embodiment is characterized in that (i) the first liquid crystal display element 2 is inclined toward the first mirror (inclined at a downward angle with respect to the primary viewer), which first mirror first reflects an image displayed by the first liquid crystal display element 2 and (ii) the first mirror is a double-sided mirror 10.

An image can be normally displayed (i.e., displayed without allowing viewers to have perception of depth) in the primary display region 15a (upper display region) of the liquid crystal display unit 1d by first causing an image to be displayed in the primary display region 15a (upper display region) of the first liquid crystal display element 2.

Then, total transmission (white display) is caused to be carried out in the secondary display region 15b (lower display region), behind which the backlight device 3 is provided, of the first liquid crystal display element 2. Consequently, the light transmitted through the secondary display region 15b (lower display region) of the first liquid crystal display element 2 is guided to the back surface of the primary display region 15a (upper display region) of the first liquid crystal display element 2 with use of the mirrors 5, 6, 7, and 10 serving as the reflecting sections.

According to the present embodiment, the features reside in that the first liquid crystal display element 2 is at an angle and the first mirror is the double-sided mirror 10. As such, an image displayed in the primary display region 15a (upper display region) of the liquid crystal display unit 1d causes an axisymmetrical image of the image displayed in the image displayed in the primary display region 15a to be displayed on a region of the first mirror, which region would, without the features, correspond to a dead space where no image is visible.

This allows the prevention of a decrease in the display region (i.e., decrease in screen size) which decrease is caused by the provision of the secondary display region 15b.

(a) and (b) of FIG. 10 each illustrate a case in which with respect to the primary viewer of the first liquid crystal display element 2, (i) total transmission (white display) is carried out in the primary display region 15a, and (ii) an image is displayed in the secondary display region 15b of the first liquid crystal display element 2. (a) of FIG. 10 illustrates the display region 15 of the liquid crystal display unit 1d, and (b) of FIG. 10 is a view schematically illustrating the arrangement of the liquid crystal display unit 1d.

A projected image can be displayed in the primary display region 15a (upper display region) of the liquid crystal display unit 1d by first causing total transmission (white display) to be carried out in the primary display region 15a (upper display region) of the first liquid crystal display element 2 so that an image projected from behind the primary display region 15a is transmitted.

Then, the image to be projected is caused to be displayed in the secondary display region 15b (lower display region), behind which the backlight device 3 is provided, of the first liquid crystal display element 2. Consequently, the image displayed in the secondary display region 15b (lower display region) is projected onto the primary display region 15a (upper display region) of the first liquid crystal display element 2 with use of the mirrors 5, 6, 7, and 10 serving as the reflecting sections.

Further, according to the present embodiment, the features are reside in that the first liquid crystal display element 2 is at an angle and the first mirror is the double-sided mirror 10. As such, an image projected onto the primary display region 15a (upper display region) of the liquid crystal display unit 1d causes an axisymmetrical image of the projected image to be displayed on a region of the first mirror, which region would, without the features, correspond to a dead space where no image is visible.

According to the above arrangement, (i) a display image directly viewed by the primary viewer of the first liquid crystal display element 2 and (ii) a projected display image can be displayed in the primary display region 15a (upper display region) of the liquid crystal display unit 1d so as to overlap each other. The liquid crystal display unit 1d can thus provide viewers with perception of depth.

Embodiment 6

Figure 11:
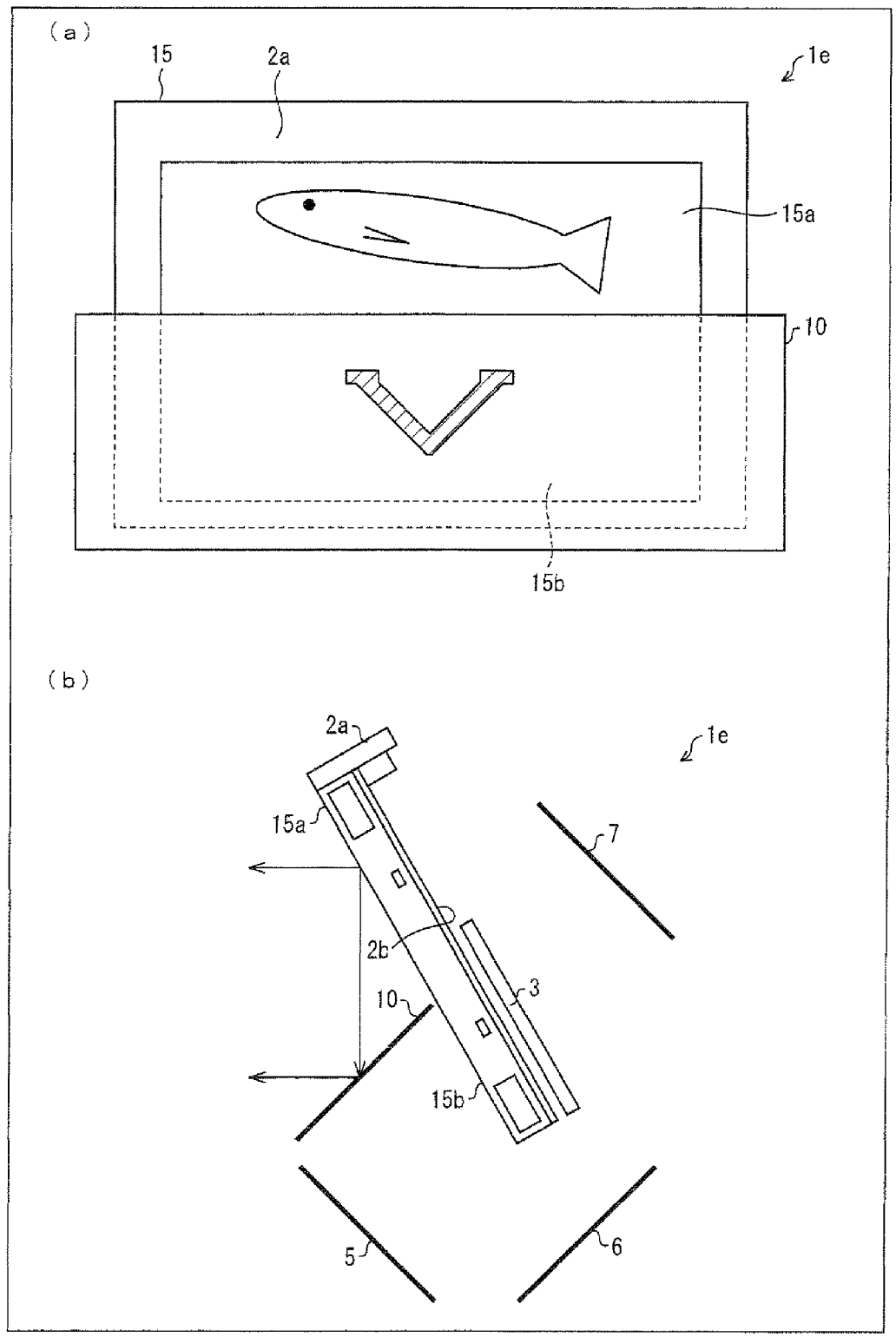
FIG. 11 is a view illustrating a liquid crystal display unit in accordance with still another embodiment of the present invention which liquid crystal display unit is being observed in a state where with respect to a primary viewer of the first liquid crystal display element which displays different images depending on a viewing angle, (i) an image is displayed in the primary display region (an image of a fish is displayed when viewed from above, whereas an image of the letter "V" is displayed when viewed from below) and (ii) total transmission (white display) is carried out in the secondary display region of the first liquid crystal display element, wherein (a) illustrates the display region of the liquid crystal display unit and (b) schematically illustrates an arrangement of the liquid crystal display unit.
Figure 12:
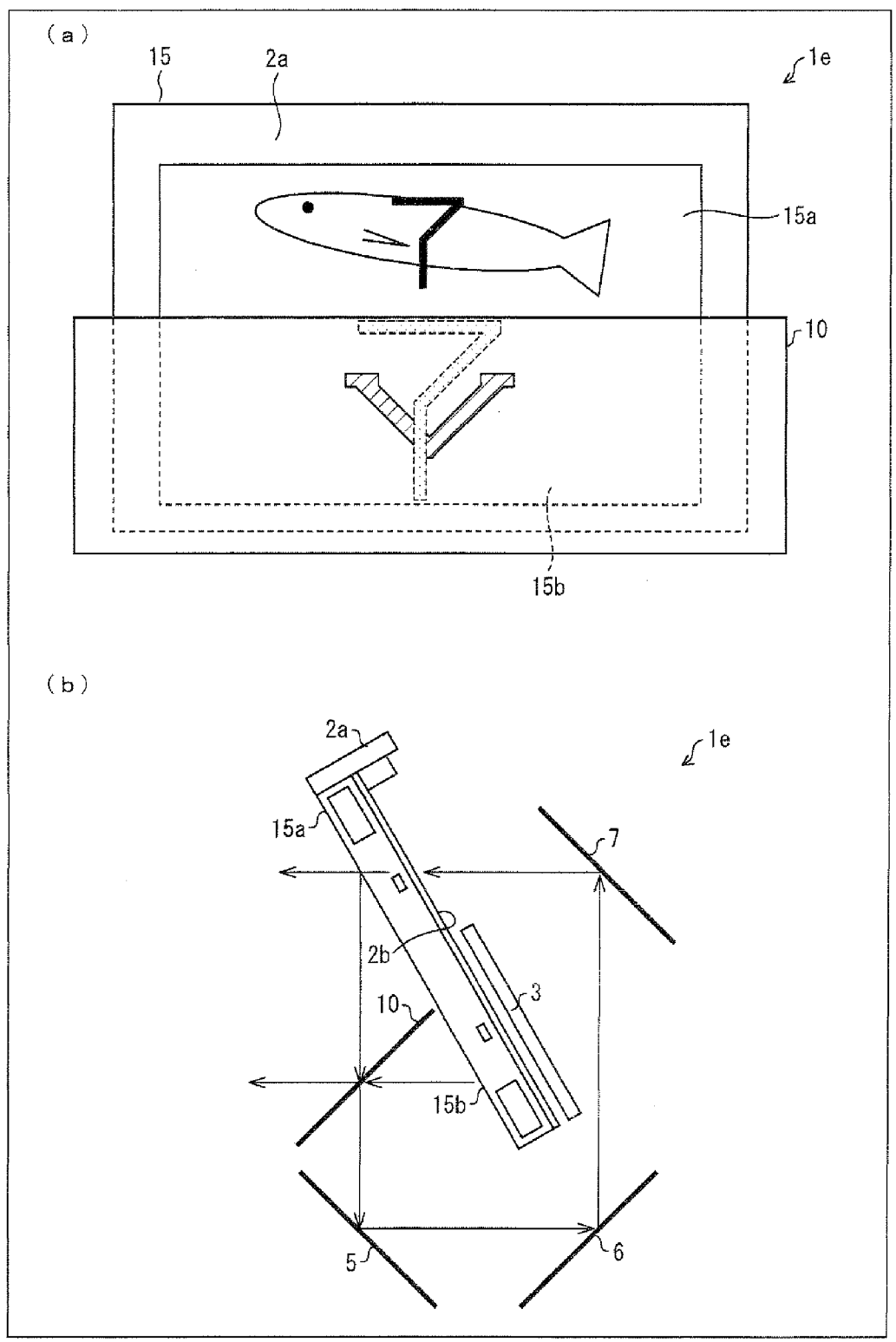
FIG. 12 is a view illustrating the liquid crystal display unit in accordance with the embodiment of the present invention which liquid crystal display unit is being observed in a state where with respect to the primary viewer of the first liquid crystal display element which displays different images depending on the viewing angle, (i) an image is displayed in the primary display region (an image of a fish is displayed when viewed from above, whereas an image of the letter "V" is displayed when viewed from below) and (ii) an image (of the number "7") is displayed in the secondary display region of the first liquid crystal display element, wherein (a) illustrates the display region of the liquid crystal display unit and (b) schematically illustrates the arrangement of the liquid crystal display unit.

The following description deals with a sixth embodiment of the present invention with reference to (a) and (b) of FIG. 11 and (a) and (b) of FIG. 12. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) of FIG. 11 illustrates the display region 15 of a liquid crystal display unit 1e in which a dual view liquid crystal display element 2a is employed. (b) of FIG. 11 is a view schematically illustrating an arrangement of the liquid crystal display unit 1e.

As illustrated in (a) and (b) of FIG. 11, the liquid crystal display unit 1e of the present embodiment is arranged as follows: With respect to a primary viewer of the dual view liquid crystal display element 2a, in which an image to be displayed changes depending on a viewing angle direction, i.e., a direction in which the dual view liquid crystal display element 2a is viewed by the primary viewer, an image is displayed in the primary display region 15a (an image of a fish is displayed when viewed from above, whereas a image of letter "V" is displayed when viewed from below), and total transmission (white display) is carried out in the secondary display region 15b of the dual view liquid crystal display element 2a.

Further, the dual view liquid crystal display element 2a is inclined toward the first mirror, which first reflects an image displayed by the dual view liquid crystal display element 2a, and the first mirror is a double-sided mirror 10.

An image can be normally displayed (i.e., displayed without allowing viewers to have perception of depth) in the primary display region 15a (upper display region) of the liquid crystal display unit 1e by first causing an image to be displayed in the primary display region 15a (upper display region) of the dual view liquid crystal display element 2a, in which an image to be displayed changes depending on the viewing angle.

Then, total transmission (white display) is caused to be carried out in the secondary display region 15b (lower display region), behind which the backlight device 3 is provided, of the dual view liquid crystal display element 2a. Consequently, the light transmitted through the secondary display region 15b (lower display region) of the dual view liquid crystal display element 2a is guided to a back surface of the primary display region 15a (upper display region) of the dual view liquid crystal display element 2a with use of the mirrors 5, 6, 7, and 10 serving as the reflecting sections.

According to the present embodiment, the dual view liquid crystal display element, in which an image to be displayed changes depending on whether it is viewed from above or from below, is employed as the dual view liquid crystal display element 2a. Specifically, the dual view liquid crystal display element displays the image of fish when viewed from above, whereas displays the image of letter "V" when viewed from below.

Further, the dual view liquid crystal display element 2a is inclined toward the first mirror, which first reflects an image displayed by the dual view liquid crystal display element 2a.

By causing the first mirror, i.e., the double-sided mirror 10, to reflect a displayed image in the primary display region 15a with respect to the primary viewer of the dual view liquid crystal display element 2a, the image (i.e., the letter "V") as viewed from below the dual view liquid crystal display element 2a can be displayed on a region of the first mirror, which region would, without the above arrangement, correspond to a dead space where no image is visible.

This allows a display to be carried out in a wide display region (i.e., a region close in area to the sum of the primary display region 15a and the secondary display region 15b). Further, it becomes easy that different images are displayed in respective upper and lower regions of such a wide display region.

In other words, it is possible to provide a liquid crystal display unit 1e which can carry out full screen displays for respective different images.

(a) of FIG. 12 illustrates the display region 15 of the liquid crystal display unit 1e in which the dual view liquid crystal display element 2a is employed, and (b) of FIG. 12 is a view schematically illustrating the arrangement of the liquid crystal display unit 1e.

As illustrated in (a) and (b) of FIG. 12, the liquid crystal display unit 1e of the present embodiment is arranged as follows: With respect to the primary viewer of the dual view liquid crystal display element 2a, which displays different images depending on the viewing angle direction, i.e., a direction in which the dual view liquid crystal display element 2a is viewed by the primary viewer, an image (an image of a fish is displayed when viewed from above, whereas an image of the letter "V" is displayed when viewed from below) is displayed in the primary display region 15a, whereas an image (of the number "7" as viewed from above) is displayed in the secondary display region 15b of the dual view liquid crystal display element 2a.

According to the arrangement illustrated in (a) and (b) of FIG. 12, an image of the number "7" in the secondary display region 15b is displayed in the primary display region 15a in addition to the display illustrated in (a) of FIG. 11.

Embodiment 7

Figure 13:
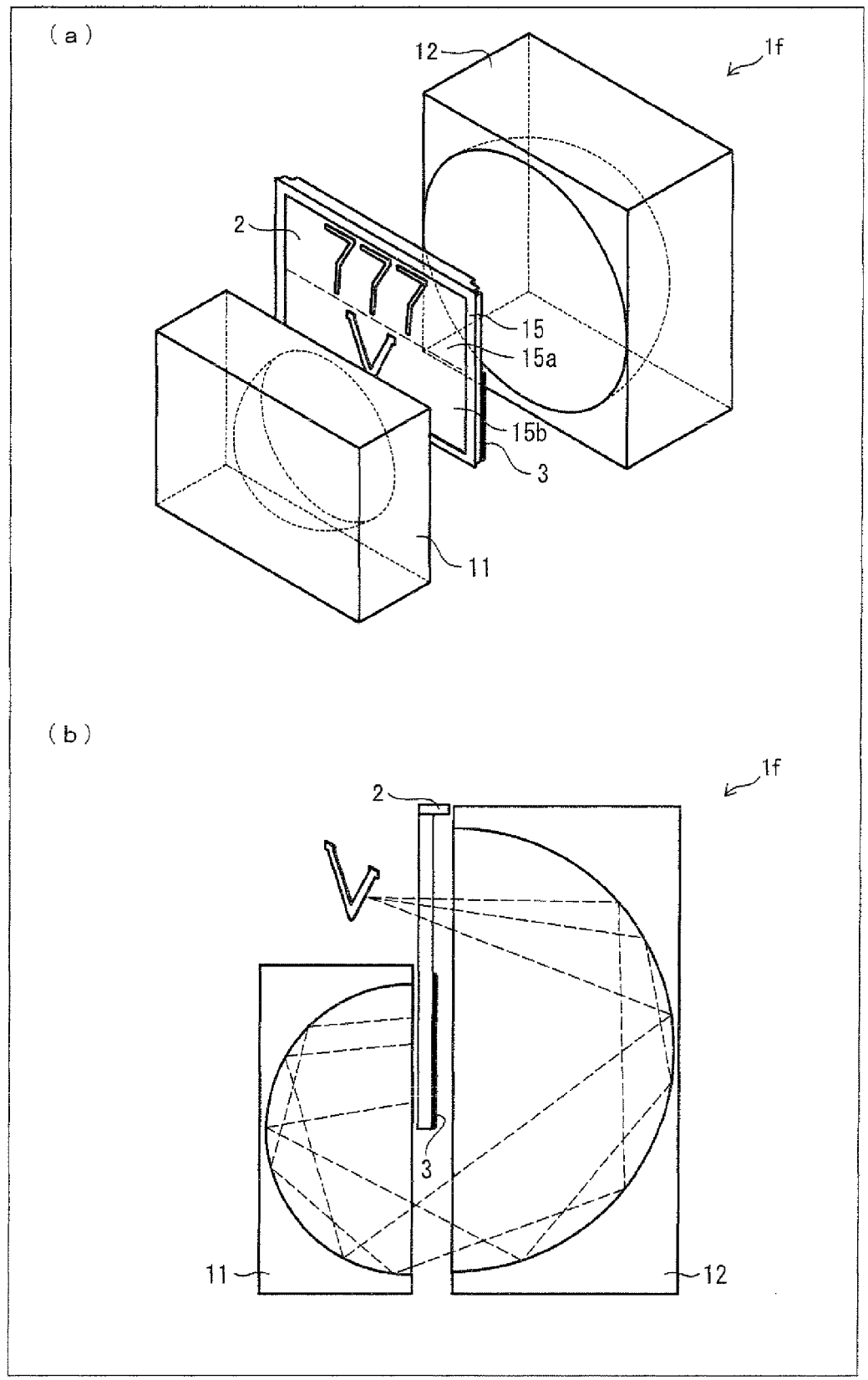
FIG. 13 is a view illustrating a liquid crystal display unit in accordance with still another embodiment of the present invention which liquid crystal display unit is being observed in a state where the primary display region and the secondary display region of the first liquid crystal display element provide a primary viewer of the first liquid crystal display element with image display; and concave mirrors are used as the reflecting sections, wherein (a) is a perspective view schematically illustrating an arrangement of the liquid crystal display unit and (b) is a cross-sectional view schematically illustrating how light is reflected in the liquid crystal display unit.

The following description deals with a seventh embodiment of the present invention with reference to (a) and (b) of FIG. 13. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

(a) and (b) of FIG. 13 each illustrate a case in which with respect to a primary viewer of the first liquid crystal display element 2, (i) an image is displayed in each of the primary display region 15a and the secondary display region 15b of the first liquid crystal display element 2 and (ii) concave mirrors 11 and 12, each of which is a spherical mirror (particularly, a hemispherical mirror), are employed as the reflecting sections. (a) of FIG. 13 illustrates the display region 15 of a liquid crystal display unit 1f, and (b) of FIG. 13 is a view schematically illustrating an arrangement of the liquid crystal display unit 1f.

According to the present embodiment, the first concave mirror 11 and the second concave mirror 12, serving as the reflecting sections, which are provided so that their respective inner surfaces face each other. This can bring about an effect of providing the primary viewer of the first liquid crystal display element 2 with a feeling that the primary viewer is closer to the image of the letter "V" displayed in the secondary display region 15b (lower display region) of the first liquid crystal display element 2 than to the number "7" displayed in the primary display region 15a (upper display region).

Embodiment 8

Figure 14:
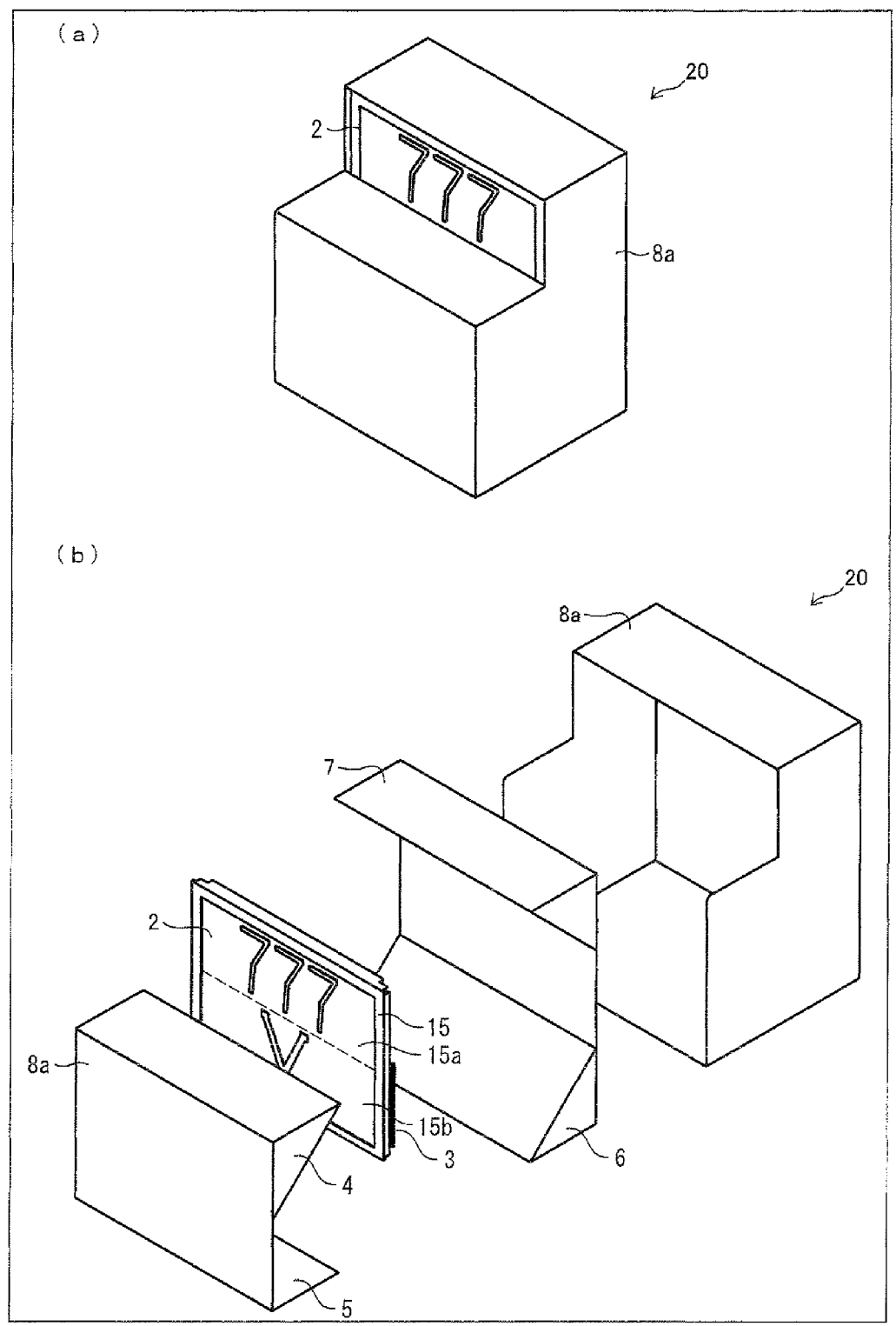
FIG. 14 is a view illustrating a gaming device in accordance with still another embodiment of the present invention which gaming device includes a liquid crystal display unit of the present invention, wherein (a) is a perspective view illustrating the gaming device and (b) is a perspective view schematically illustrating an arrangement of the gaming device.

The following description deals with an eighth embodiment of the present invention with reference to (a) and (b) of FIG. 14. The present embodiment is identical to Embodiment 1 except for points described below of the present embodiment. For convenience, members in the present embodiment which are identical in function to their equivalents illustrated in the drawings for Embodiment 1 are assigned the same reference numerals, and are not described here.

Each of (a) and (b) of FIG. 14 is a view illustrating a gaming device 20 including a liquid crystal display unit of the present invention.

The present embodiment has an arrangement different from a conventional arrangement which provides viewers with perception of depth with use of an accessory. The present embodiment allows a display which provides viewers with perception of depth to be carried out with respect to a primary viewer of the first liquid crystal display element 2 with use of difference in display location between the following two images: (i) an image (first image) directly displayed by the first liquid crystal display element 2, and (ii) an image (second image) displayed by projecting an image, displayed by the first liquid crystal display element 2, onto the back surface of the first liquid crystal display element 2 with use of the first mirror 4, which first reflects the image; the second mirror 5, which then reflects the image; the third mirror 6, which reflects the image third; and the fourth mirror 7, which reflects the image last.

In other words, according to the arrangement, the image projected onto the back surface of the first liquid crystal display element 2, i.e., the image displayed in the secondary display region 15b, functions as the conventional accessory.

As described above, the present embodiment does not require a conventional accessory. This eliminates the need to secure a space especially for an accessory, and thus enables production of a compact gaming device 20.

To make the gaming device more compact, the present embodiment uses (i) a member in which an external box 8a, the first mirror 4, and the second mirror 5 are integrated with one another and (ii) a member in which the third mirror 6 and the fourth mirror 7 are similarly integrated with each other.

Modification

The following description deals with a variation of the present invention with reference to (a) and (b) of FIG. 15. The present variation is identical to Embodiment 1 except for points described below of the present variation. For convenience, members in the present variation which are identical in function to their equivalents illustrated in the drawings for Embodiment 1 are assigned the same reference numerals, and are not described here.

(a) and (b) of FIG. 15 each illustrate an example arrangement in which the display region 15 of the first liquid crystal display element 2 is divided into two display regions, i.e., right and left display regions are adjacent to each other in a right-and-left direction when viewed by the primary viewer of the first liquid crystal display element 2.

The arrangement enables production of a gaming device 20a which can project an image, which has been displayed on the left display region, onto the right display region so that the image is displayed on the right display region.

Further, the gaming device 20a having the above arrangement can provide viewers with perception of depth by carrying out a display so that the images on the respective right and left display regions overlap each other.

As described above, the liquid crystal display unit of the present invention is arranged such that a display region on the front surface of the first liquid crystal display element includes (i) a primary display region which can be directly viewed by a primary viewer of the first liquid crystal display element and (ii) a secondary display region which cannot be directly viewed by the primary viewer, the backlight device is provided only in a region behind the first liquid crystal display element and the region corresponding to the secondary display region, and the reflecting section is provided so that light emitted from the secondary display region toward the primary viewer is reflected from the reflecting section and is then emitted again from behind the primary display region toward the primary viewer.

With the arrangement, it is possible to produce a liquid crystal display unit which can carry out, with a simple arrangement, a display that provides viewers with perception of depth.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The liquid crystal display unit and gaming device of the present invention, each of which can carry out a display which provides viewers with perception of depth, are suitably applicable to amusement equipment such as a gaming device.

The invention claimed is:

1. A liquid crystal display unit, comprising:
   a first liquid crystal display element on which front surface an image is displayed;
   a backlight device provided behind the first liquid crystal display element; and
   a reflecting section from which light emitted from the first liquid crystal display element is reflected,
   a display region on the front surface of the first liquid crystal display element, including (i) a primary display region which can be directly viewed by a primary viewer of the first liquid crystal display element and (ii) a secondary display region which cannot be directly viewed by the primary viewer,
   the backlight device being provided only in a region behind the first liquid crystal display element and the region corresponding to the secondary display region, and
   the reflecting section being provided so that light emitted from the secondary display region toward the primary viewer is reflected from the reflecting section and is then emitted again from behind the primary display region toward the primary viewer.

2. The liquid crystal display unit according to claim 1, wherein an image displayed in the secondary display region is reflected from the reflecting section so as to be displayed in the primary display region.

3. The liquid crystal display unit according to claim 1, wherein the reflecting section includes:
   a first mirror provided in front of the first liquid crystal display element; and
   a second mirror provided behind the first liquid crystal display element.

4. The liquid crystal display unit according to claim 3, wherein the first and second mirrors each include at least one of a plate-shaped mirror, a curved mirror, and a spherical mirror.

5. The liquid crystal display unit according to claim 3, wherein:
   the first and second mirrors each include two plate-shaped mirrors, and
   the two mirrors provided in each of the first and second mirrors are at an angle of 90 degrees with each other.

6. The liquid crystal display unit according to claim 5, wherein the two mirrors provided in each of the first and second mirrors are at an angle of 45 degrees with the first liquid crystal display element.

7. The liquid crystal display unit according to claim 3, wherein:
   the first and second mirrors are first and second hemispherical mirrors, respectively, and
   the first and second hemispherical mirrors are provided so that their inner surfaces face each other.

8. The liquid crystal display unit according to claim 1, wherein the reflecting section is provided so as to be able to change a length of an optical path of the light emitted from the secondary display region, which optical path extends from a front surface of the secondary display region to a back surface of the primary display region.

9. The liquid crystal display unit according to claim 8, wherein:
   the reflecting section includes mirrors at least part of which is movably provided; and
   the length of the optical path is variable by moving the at least part of the mirrors.

10. The liquid crystal display unit according to claim 1, further comprising:
    a second liquid crystal display element which has a scattering function and which is provided in a region behind the first liquid crystal display element, which region corresponds to the primary display region.

11. The liquid crystal display unit according to claim 10, wherein the second liquid crystal display element is a polymer-dispersed liquid crystal element.

12. The liquid crystal display unit according to claim 1, wherein the first liquid crystal display element is capable of displaying different images in respective different directions.

13. The liquid crystal display unit according to claim 12, wherein the first liquid crystal display element is a dual view liquid crystal display element.

14. The liquid crystal display unit according to claim 12, further comprising:
    a mirror, provided in front of the first liquid crystal display element, which causes the images displayed in the respective different directions to be displayed in an identical direction.

15. The liquid crystal display unit according to claim 1, wherein the first liquid crystal display element is inclined with respect to the primary viewer of the first liquid crystal display element.

16. The liquid crystal display unit according to claim 1, wherein the display region of the first liquid crystal display element is provided so that the primary display region and the secondary display region are adjacent to each other in an up-and-down direction when viewed by the primary viewer of the first liquid crystal display element.

17. The liquid crystal display unit according to claim 1, wherein the display region of the first liquid crystal display element is provided so that the primary display region and the secondary display are adjacent to each other in a right-and-left direction when viewed by the primary viewer of the first liquid crystal display element.

18. A gaming device comprising a liquid crystal display unit recited in claim 1.

* * * * *